US010482756B2

(12) United States Patent
Kumar et al.

(10) Patent No.: US 10,482,756 B2
(45) Date of Patent: Nov. 19, 2019

(54) INTELLIGENT ALERTS IN MULTI-USER ENVIRONMENT

(71) Applicant: QUALCOMM Incorporated, San Diego, CA (US)

(72) Inventors: Akash Kumar, Hyderabad (IN); Sai Pradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/642,408

(22) Filed: Jul. 6, 2017

(65) Prior Publication Data

US 2019/0012902 A1    Jan. 10, 2019

(51) Int. Cl.

| G08B 25/10 | (2006.01) |
|---|---|
| H04W 4/02 | (2018.01) |
| G08B 3/10 | (2006.01) |
| H04L 29/08 | (2006.01) |
| H04W 4/029 | (2018.01) |
| H04W 4/38 | (2018.01) |
| H04W 4/33 | (2018.01) |
| H04W 4/70 | (2018.01) |
| H04W 4/80 | (2018.01) |

(52) U.S. Cl.
CPC ............ *G08B 25/10* (2013.01); *G08B 3/10* (2013.01); *H04L 67/22* (2013.01); *H04L 67/26* (2013.01); *H04W 4/02* (2013.01); *H04W 4/029* (2018.02); *H04L 67/24* (2013.01); *H04L 67/306* (2013.01); *H04W 4/023* (2013.01); *H04W 4/33* (2018.02); *H04W 4/38* (2018.02); *H04W 4/70* (2018.02); *H04W 4/80* (2018.02)

(58) Field of Classification Search
CPC ............ G08B 25/10; G08B 3/10; H04W 4/02
USPC .................................................... 340/539.13
See application file for complete search history.

(56) References Cited

U.S. PATENT DOCUMENTS

| 2006/0126856 A1* | 6/2006 | Chien ...................... H03G 3/32 |
|---|---|---|
| | | 381/57 |
| 2013/0141233 A1* | 6/2013 | Jacobs ................... G08B 19/00 |
| | | 340/521 |

(Continued)

FOREIGN PATENT DOCUMENTS

EP        3089128 A2    11/2016

OTHER PUBLICATIONS

International Search Report and Written Opinion—PCT/US2018/034066—ISP/EPO—dated Jan. 7, 2019.

*Primary Examiner* — Jack K Wang
(74) *Attorney, Agent, or Firm* — Thien T. Nguyen

(57) ABSTRACT

Techniques for providing a notification to a user in a home network are provided. An example method according to the disclosure includes receiving an alert for the user, determining a location of the user, determining one or more proximate devices based on the location of the user, determining a location of one or more proximate non-interested users based on the proximate devices, determining an activity of the user, determining a preferred notification device based at least in part on the location of the user, the location of one or more proximate non-interested users, and the activity of the user, generating a notification message based at least in part on the preferred notification device, and sending the notification message to the preferred notification device.

41 Claims, 12 Drawing Sheets

(56) References Cited

U.S. PATENT DOCUMENTS

| | | |
|---|---|---|
| 2013/0331101 A1* | 12/2013 | Thomas .................. H04W 8/18 |
| | | 455/435.1 |
| 2015/0134761 A1 | 5/2015 | Sharma et al. |
| 2015/0156030 A1* | 6/2015 | Fadell ................. H04L 12/2816 |
| | | 700/90 |
| 2016/0027278 A1* | 1/2016 | McIntosh ........... G08B 21/0423 |
| | | 715/741 |
| 2016/0139575 A1 | 5/2016 | Funes |
| 2016/0226761 A1 | 8/2016 | Hui et al. |
| 2016/0234206 A1 | 8/2016 | Tunnell et al. |
| 2016/0285974 A1 | 9/2016 | Shurtleff et al. |
| 2016/0301649 A1 | 10/2016 | Faaborg et al. |
| 2016/0377697 A1* | 12/2016 | Sella ..................... G01S 5/0289 |
| | | 342/451 |
| 2017/0034649 A1 | 2/2017 | Dotan-Cohen et al. |
| 2017/0099592 A1 | 4/2017 | Loeb et al. |
| 2017/0124824 A1 | 5/2017 | Chan et al. |
| 2017/0195856 A1* | 7/2017 | Snyder .................. H04W 4/021 |
| 2018/0082565 A1* | 3/2018 | Braiman ............ G08B 21/0272 |
| 2018/0268674 A1* | 9/2018 | Siminoff .......... G08B 13/19613 |

\* cited by examiner

FIG. 8A

| Index | Start time | End time | UserID | User Location | DevicePref | Activity |
|---|---|---|---|---|---|---|
| [uniqueID] | [yyyy:dd:mm:hh:mm:ss] | [yyyy:dd:mm:hh:mm:ss] | [link to User table] | [ENU/LLA] | [link to DevicePref table] | [link to activity table] |

220 — table; 222 Index, 224 [uniqueID], 226 Start time, 228, 230 End time, 232 UserID, 234 User Location, 236 DevicePref, 238 Activity

FIG. 8B

| Index | DeviceID | Start time | End time | Device Location | Acoustic status | State |
|---|---|---|---|---|---|---|
| [uniqueID] | [link to Device table] | [yyyy:dd:mm:hh:mm:ss] | [yyyy:dd:mm:hh:mm:ss] | [ENU/LLA] | [double] | [AppRef] |

240 — table; 242 Index, 244 [uniqueID], 246 DeviceID, 248 Start time, 250 End time, 252, 254 Device Location, 258 Acoustic status, 260 State

FIG. 8C

| Index | UserID | DeviceID | Priority | Steer Vector | TargetVolume | ActVolume |
|---|---|---|---|---|---|---|
| [uniqueID] | [link to User table] | [link to Device table] | [integer] | [double] | [integer] | [integer] |

270 — table; 272 Index, 274 [uniqueID], 276 UserID, 278, 280 DeviceID, 282 Priority, 284 Steer Vector, 286 TargetVolume, 288 ActVolume

INTELLIGENT ALERTS IN MULTI-USER ENVIRONMENT

BACKGROUND

Devices, both mobile and static, are increasingly equipped to wirelessly communicate with other devices and/or to take measurements from which their locations may be determined and/or locations may be determined of other devices from which one or more signals are received. An electronic notification process may be used to send notifications from one device to another device based on the locations of the devices. Locations of devices may be determined by the devices themselves, or by another device that is provided with the measurements, or by another device that takes the measurements. For example, a device may determine its own location based on satellite positioning system (SPS) signals, cellular network signals, and/or Wi-Fi signals, etc. that the devices receive. The location of a user may often be associated with the location of a mobile or static device, such as a mobile phone or a static work station. Notifications/alerts may be sent to a user based on an association with a device. Associating a single user with a device can be problematic when devices may move or be shared by multiple users. Further, multiple users may be associated with a single device or multiple devices simultaneously. In a multi-user environment, sending redundant messages to multiple devices may create an unpleasant environment for users that are not interested in the notifications emitted for a particular device. In some cases, the user may be engaged in an activity such as sleeping, cooking, or exercising which may impact their ability to receive a notification. An electronic notification process should consider the location and current activity of the intended recipient and provide an appropriate notification.

SUMMARY

An example of a method of providing a notification to a user in a home network according to the disclosure includes receiving, at a communication device, an alert for the user, determining, by the communication device, a location of the user, determining, by the communication device, one or more proximate devices based on the location of the user, determining, by the communication device, a location of one or more proximate non-interested users based on the proximate devices, determining, by the communication device, an activity of the user, determining, by the communication device, a preferred notification device based at least in part on the location of the user, the location of one or more proximate non-interested users, and the activity of the user, generating, by the communication device, a notification message based at least in part on the preferred notification device, and sending, by the communication device, the notification message to the preferred notification device.

Implementations of such a method may include one or more of the following features. Determining the location of the user may be based on one or more presence sensors in the home network. The method may further include calculating, by the communication device, a target sound level for the preferred notification device based at least in part on the location of the one or more proximate non-interested users, and generating, by the communication device, the notification message based at least in part on the target sound level. The target sound level may include a beam steering element and a volume element. The volume element may be based at least in part on the user. The method may also include determining, by the communication device, an activity for each of the one or more proximate non-interested users, and calculating, by the communication device, a target sound level for each of the proximate devices based at least in part on the activity for each of the one or more proximate non-interested users. The communication device may be a central controller. The notification message may include one or more information elements configured to cause a device to display the notification message to the user.

An example of an apparatus for providing a notification to a user in a home network according to the disclosure includes a transceiver configured to receive an alert for the user, and at least one processor operably coupled to the transceiver and configured to determine a location of the user, determine one or more proximate devices based on the location of the user, determine a location of one or more proximate non-interested users based on the proximate devices, determine an activity of the user, determine a preferred notification device based at least in part on the location of the user, the location of one or more proximate non-interested users, and the activity of the user, generate a notification message based at least in part on the preferred notification device, and send the notification message to the preferred notification device.

Implementations of such an apparatus may include one or more of the following features. The at least one processor may be operably coupled to one or more presence sensors in the home network. The at least one processor may be further configured to calculate a target sound level for the preferred notification device based at least in part on the location of the one or more proximate non-interested users, and generate the notification message based at least in part on the target sound level. The target sound level may include a beam steering element and a volume element. The volume element may be based at least in part on the user. The at least one processor may be further configured to determine an activity for each of the one or more proximate non-interested users, and calculate a target sound level for each of the proximate devices based at least in part on the activity for each of the one or more proximate non-interested users. The notification message may include one or more information elements configured to cause a device to display the notification message to the user.

An example of an apparatus for providing a notification to a user in a home network according to the disclosure includes means for receiving an alert for the user, means for determining a location of the user, means for determining one or more proximate devices based on the location of the user, means for determining a location of one or more proximate non-interested users based on the proximate devices, means for determining an activity of the user, means for determining a preferred notification device based at least in part on the location of the user, the location of one or more proximate non-interested users, and the activity of the user, means for generating a notification message based at least in part on the preferred notification device, and means for sending the notification message to the preferred notification device.

An example of a method for providing a notification to a user in a home network according to the disclosure includes receiving, at a communication device, an alert from an electronic device, determining, by the communication device, a location for one or more users in the home network, determining, by the communication device, an activity for the one or more users in the home network, determining, by the communication device, an alert relevancy for the one or more users in the home network based on the electronic device, determining, by the communication device, a notification user and a notification device based at least in part on the location, the activity, and the alert relevancy for the one or more users in the home network, generating, by the communication device, a notification message based at least in part on the notification user and the notification device, and sending, by the communication device, the notification message to the notification device.

Implementations of such a method may include one or more of the following features. Determining the location of the one or more users may be based on one or more presence sensors in the home network. The electronic device may be a security system configured to determine an identity of a visitor, and wherein determining the alert relevancy for the one or more users in the home network is based at least in part on the identity of the visitor. The method may further include calculating, by the communication device, a target sound level for the notification device based at least in part on the notification user, and generating, by the communication device, the notification message based at least in part on the target sound level. The target sound level may include a beam steering element and a volume element. The communication device may be a central controller. The notification message may include one or more information elements configured to cause a display screen to display the notification message to the user.

An example of an apparatus for providing a notification to a user in a home network according to the disclosure includes a transceiver configured to receive an alert from an electronic device, and at least one processor operably coupled to the transceiver and configured to determine a location for one or more users in the home network, determine an activity for the one or more users in the home network, determine an alert relevancy for the one or more users in the home network based on the electronic device, determine a notification user and a notification device based at least in part on the location, the activity, and the alert relevancy for the one or more users in the home network, generate a notification message based at least in part on the notification user and the notification device, and send the notification message to the notification device.

Implementations of such an apparatus may include one or more of the following features. The at least one processor may be configured to determine the location of the one or more users is based on one or more presence sensors in the home network. The electronic device may be a security system configured to determine an identity of a visitor, and the at least one processor may be configured to determine the alert relevancy for the one or more users in the home network is based at least in part on the identity of the visitor. The at least one processor may be configured to calculate a target sound level for the notification device based at least in part on the notification user, and generate the notification message based at least in part on the target sound level. The target sound level may include a beam steering element and a volume element. The notification message may include one or more information elements configured to cause a display screen to display the notification message to the user.

An example of an apparatus for providing a notification to a user in a home network according to the disclosure includes means for receiving an alert from an electronic device, means for determining a location for one or more users in the home network, means for determining an activity for the one or more users in the home network, means for determining an alert relevancy for the one or more users in the home network based on the electronic device, means for determining a notification user and a notification device based at least in part on the location, the activity, and the alert relevancy for the one or more users in the home network, means for generating a notification message based at least in part on the notification user and the notification device, and means for sending the notification message to the notification device.

Items and/or techniques described herein may provide one or more of the following capabilities, as well as other capabilities not mentioned. A wireless home network may include multiple appliances and/or devices and a central controller. Presence sensors and other devices in the home network may be used to determine a user's location and current activity. The central controller may store the user location and activity information. User notification preferences may also persist on the central controller or on other devices in the home network. The central controller may receive a notification for a user. On or more notification devices may be determined based on the location of the user, the activity of the user, the locations of other users, the activities of the other users, and/or other user preferences. Notification messages may be generated based on the notification devices. The notification messages may include volume and beam steering information elements. The resulting user specific directed notifications may reduce the disruptions to other users in the home. Other capabilities may be provided and not every implementation according to the disclosure must provide any, let alone all, of the capabilities discussed.

BRIEF DESCRIPTION OF THE DRAWINGS

FIGS. 8A-8C are example data tables for use in providing notifications in a multi-user environment.

DETAILED DESCRIPTION

Techniques are discussed herein for providing notifications to a user in a multi-user environment. An increasing number of household smart devices are becoming available to the consumer market. For example, with growing popularity of Internet of Things (IoT) devices, the number of connected devices in a smart home is increasing. In a home with multiple users and with multiple devices, the growing number of devices and possible user notifications is adding more complexity and clutter to user notification processes. The myriad of several notifications broadcast from multiple devices may create an unpleasant environment for users that are not interested in particular notifications from particular devices. Current notifications from a device do not consider the presence of multiple different users in a smart home and the relevance of other users to a notification from a particular device.

The smart devices in a home may be capable of exchanging information with other devices on a network. The smart devices may also be used to determine a user's location within the home. For example, a voice identification system such as the Xfinity® TV remote, Amazon Echo®, Google Home® may be used to identify individual users and associate each user to a device or physical location. Other sensors such as cameras and motions detectors may be used to determine the location of the user. A network controller can maintain data tables containing location, activity and notification preference information for multiple users. The user location information can be correlated to proximate network devices and notifications for a specific user may be directed to one or more proximate devices. For each user location (and/or a corresponding activity) an alert tone and volume for a notification may be used. Further, the one or more devices may be used to steer a notification based on the location of the user.

Figure 1:
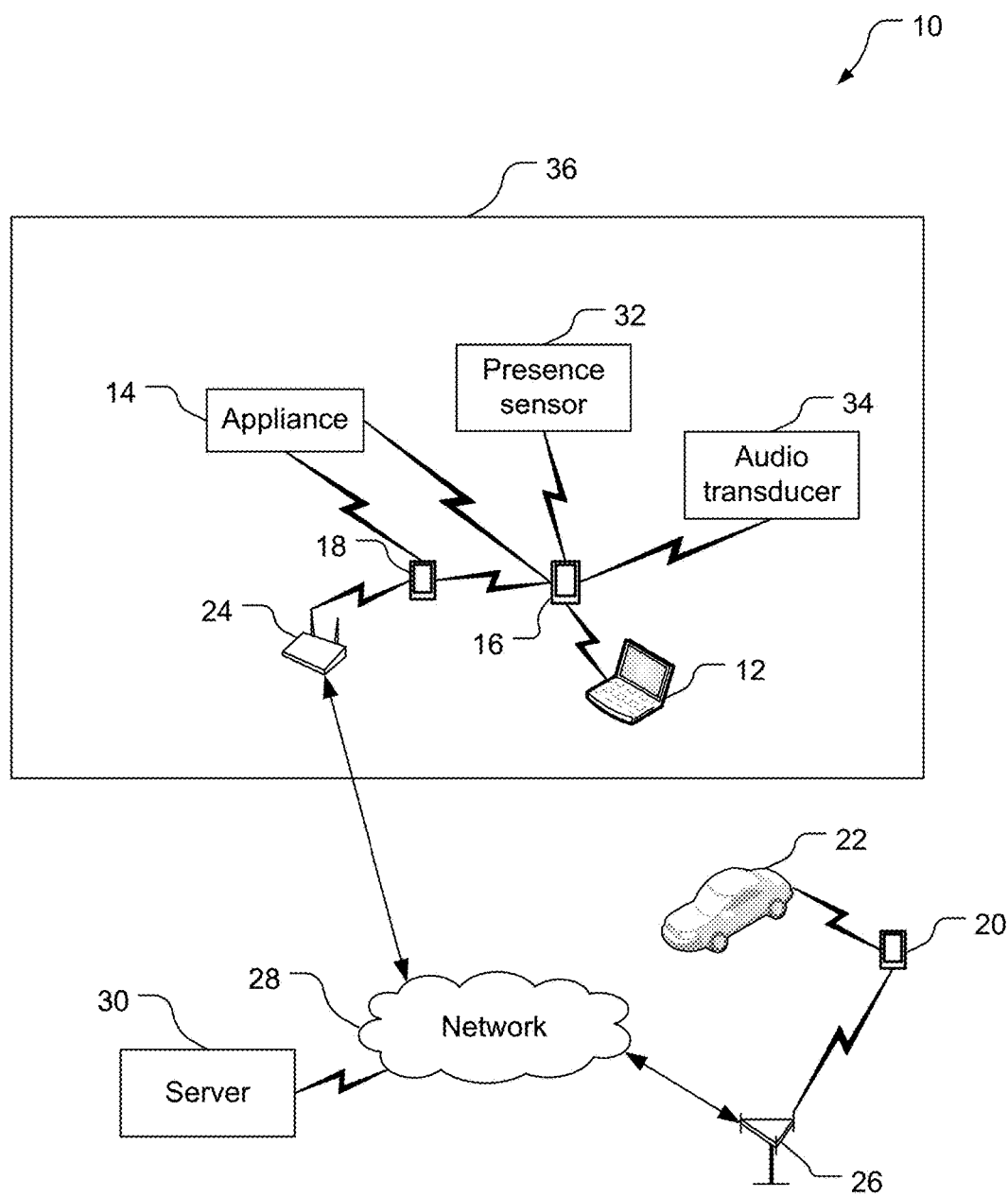
FIG. 1 is a simplified view of a communication system.

Referring to FIG. 1, a communication system 10 includes devices 12, 14, 16, 18, 20, 22, an access point 24, a base station 26, a network 28, a server 30, a presence sensor 32, and an audio transducer 34. The devices 12, 14, 16, 18, the access point 24, the presence sensor 32, and the audio transducer 34 are disposed inside a structure 36 (e.g., a building). The system 10 is a communication system in that components of the system 10 can communicate with one another directly or indirectly, e.g., via the network 28 and/or the access point 24 and/or the base station 26 (or other access points and/or other bases stations not shown). The system 10 is a communication system in that at least some of the components of the system 10 can communicate with one another wirelessly. For example, the base station 26 and the device 20 may communicate wirelessly using signals according to one or more protocols such as LTE, GSM, CDMA, or OFDM. The single access point 24 and the single base station 26 are examples only, and other quantities of access points and/or base stations may be used. Also, the types of the devices 12, 14, 16, 18, 20, 22 (e.g., an appliance, a smart phone, a tablet computer, a laptop computer, and a car) are examples and other types of devices may be used, whether currently existing or developed in the future. The term "base station" does not limit the base station 26 to any particular form, protocol, etc. For example, any of the base station 26 (and/or other base stations not shown) may be referred to as a base transceiver station (BTS), an access node (AN), a Node B, an evolved Node B (eNB), etc. Further, the device 22 is a car and while the primary function of a car is not as a communication device, the car will comprise a communication device as a part of the car, and for simplicity of the disclosure the car is considered as one type of communication device herein.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include BLUETOOTH communications, BLUETOOTH Low-Energy communications, and Wi-Fi communications. The devices 12, 14, 16, 18, 20, 22 may broadcast information, and/or may relay information from one of the devices 12, 14, 16, 18, 20, 22 to another or to another device such as the access point 24 and/or the base station 26. One or more of the devices 12, 14, 16, 18, 20, 22 may include multiple types of radios, e.g., a BLUETOOTH radio, a Wi-Fi radio, a cellular radio (e.g., LTE, CDMA, 3G, 4G, etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26.

Figure 2:
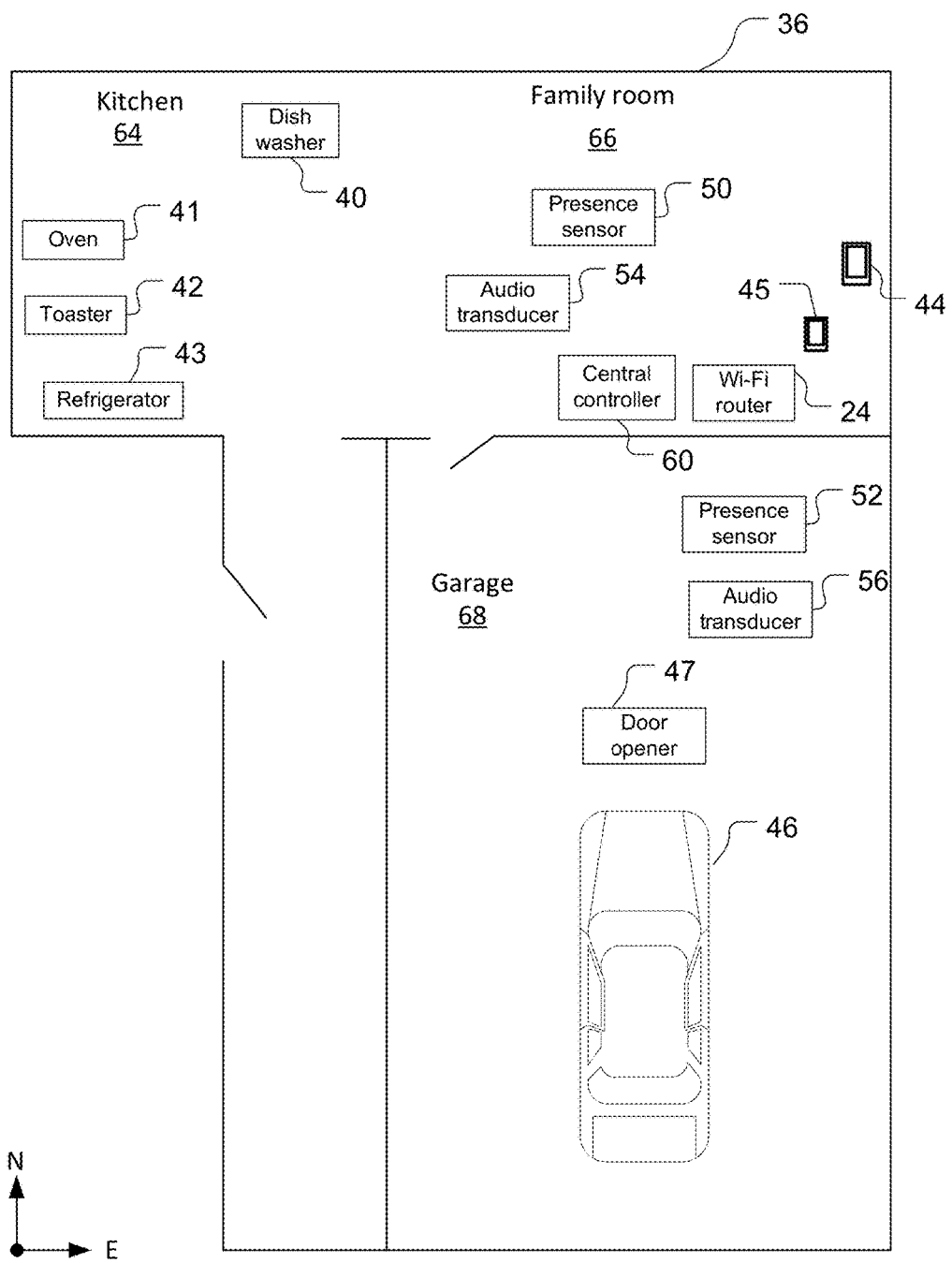
FIG. 2 is a simplified top view of an indoor portion of an example communication system.

Referring to FIG. 2, and indoor portion of the system 10 inside of the structure 36 includes wireless communication appliances/devices 40, 41, 42, 43, 44, 45, 47, presence sensors 50, 52, audio transducers 54, 56, a central controller 60, and the access point 24 (here a Wi-Fi router). In this example, the devices 40-47 include a dishwasher 40, an oven 41, a toaster 42, and a refrigerator 43 disposed in a kitchen 64, a tablet 44, a smart phone 45, and a television disposed in a family room 66, and a car 46 and a garage door opener 47 disposed in a garage 68. These devices 40-47 are configured to communicate with each other if within communication range of each other, and to communicate with the presence sensors 50, 52 and the central controller 60. Using the communication capabilities between each other, information regarding the devices 40-47 may be sent to each other, relayed to other devices, or even relayed to the central controller 60. Further, communications from the central controller 60 may be received by, or forwarded by, the devices 40-47. Further still, the central controller 60 may be a standalone device as shown in FIG. 2 or may be incorporated into any of the devices 40-47. The system 10, in this example, provides an IoT network that can generate, send, receive, relay or forward, various information (e.g., attributes, attribute tables, information relating to attributes, signal measurements, location indications, acoustic information, etc.) to facilitate functionality described herein. The devices 40-47 are examples only, and other types of devices, as well as other quantities of devices, may be used.

The presence sensors 50, 52 facilitate detection of the presence of devices and/or users. The presence sensors 50, 52 may detect the presence of devices and/or persons in any of a variety of ways. For example, either or both of the presence sensors 50, 52 may comprise a movement sensor, e.g., that sends signals, measures their reflections, and compares present reflections with previous reflections. The signals may be visible or non-visible (e.g., infrared) light signals and audible or non-audible (e.g., ultrasound) sound signals. Either or both of the presence sensors 50, 52 may comprise a heat sensor, e.g., including an infrared sensor. Either or both of the presence sensors 50, 52 may be communicatively coupled (e.g., hard-wired or wirelessly in communication with) one or more of the devices 40-47 and/or the central controller 60. The presence sensors 50, 52 are configured to report the detection of presence (possibly only if new, or possibly new and ongoing) of a relevant object such as a person.

The audio transducers 54, 56 facilitate the reception and provision of commands from users to the central controller 60 or other appropriate device. The audio transducers are preferably communicatively coupled (e.g., hard-wired or in wireless communication with) the central controller 60 and are configured to receive verbal commands, convert these commands to electrical signals, and send the signals to the central controller 60 or other appropriate device. The audio transducers 54, 56 may send the signals to the central controller 60 or other appropriate device directly or indirectly (e.g., through one or more intermediate devices that relay the signals) such as one or more of the devices 40-47.

Figure 3:
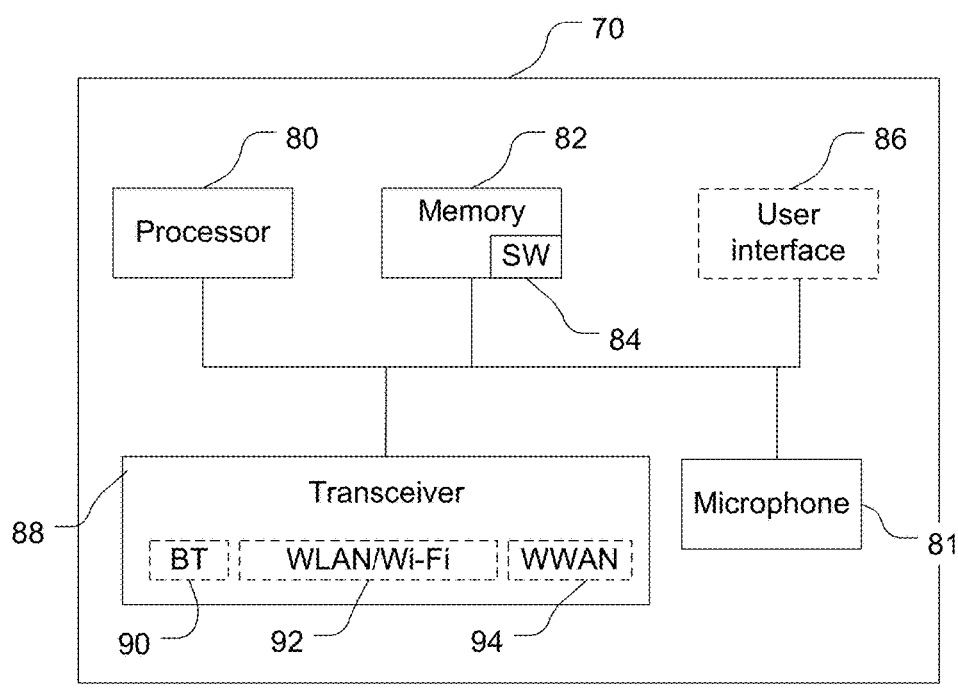
FIG. 3 is a block diagram of components of communication device shown in FIG. 2.

Referring to FIG. 3, with further reference to FIG. 1, an example device 70 comprises a computer system including a processor 80, a microphone 81, a memory 82 including software (SW) 84, an optional user interface 86, and a transceiver 88. The processor 80 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 80 may comprise multiple separate physical entities that can be distributed in the device 70. The microphone 81 may include a transducer and other circuitry for providing acoustic information to the processor 80 in a digital or analog format. The microphone 81 may be a high sensitivity or high bandwidth microphone configured to detect acoustics that are not in the audible frequency range of human ears. The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the user interface 86 (as appropriate), and/or the transceiver 88 provide means for performing functions as described herein, for example, means for receiving an alert for a user, means for determining a location of the user, means for determining one or more proximate devices, means for determining the locations of proximate non-interested users, means for determining the activity of a user, means for determining a preferred notification device, means for generating a notification device, and means for sending a notification message. The software 84 can be loaded onto the memory 82 by being downloaded via a network connection, uploaded from a disk, etc. The device 70 may be any of the devices 40-47 shown in FIG. 2, or another device. The user interface 86 (e.g., a display and/or speaker) is optional, e.g., with the tablet 44 and the smart phone 45 including a display, a microphone 81, and a speaker while the garage door opener 47 does not (typically) include a display, a microphone 81, or a speaker, although the garage door opener 47 may include a user interface of some sort, e.g., switches operable by a user.

The transceiver 88 is configured to send communications wirelessly from the device 70 and to receive wireless communications into the device 70, e.g., from the devices 40-47, the access point 24, or the central controller 60. Thus, the transceiver 88 includes one or more wireless communication radios. In the example shown in FIG. 3, the transceiver 88 optionally includes a BLUETOOTH radio 90, a WLAN/Wi-Fi radio 92, and WWAN radio 94 (e.g., long-term evolution (LTE) radio). As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the devices 40-47 or to another device such as the access point 24. Thus, for example, the device 70 may receive a wireless communication using the BLUETOOTH radio 90, and forward the communication using the WLAN/Wi-Fi radio 92 to another device that does not include a BLUETOOTH radio.

The processor 80 is configured to relay communications between devices, for example, from the central controller 60 the devices 40-47 or from the devices 40-47 to the central controller. For example, the processor 80 may receive, via the transceiver 88, the request from the central controller 60 (directly or indirectly, e.g., from another of the devices 40-47) for the location of one of the devices 40-47. The processor 80 may relay the request to one or more of the devices 40-47 within communication range of the device 70. The processor 80 is further configured to relay a reply from any of the devices 40-47 to the central controller 60, or to another device for further relay until the reply reaches the central controller 60. The reply, for example, may be a location of a target device, and the location may be a distance relative to another device, for example from the device from which the reply is received.

Figure 4:
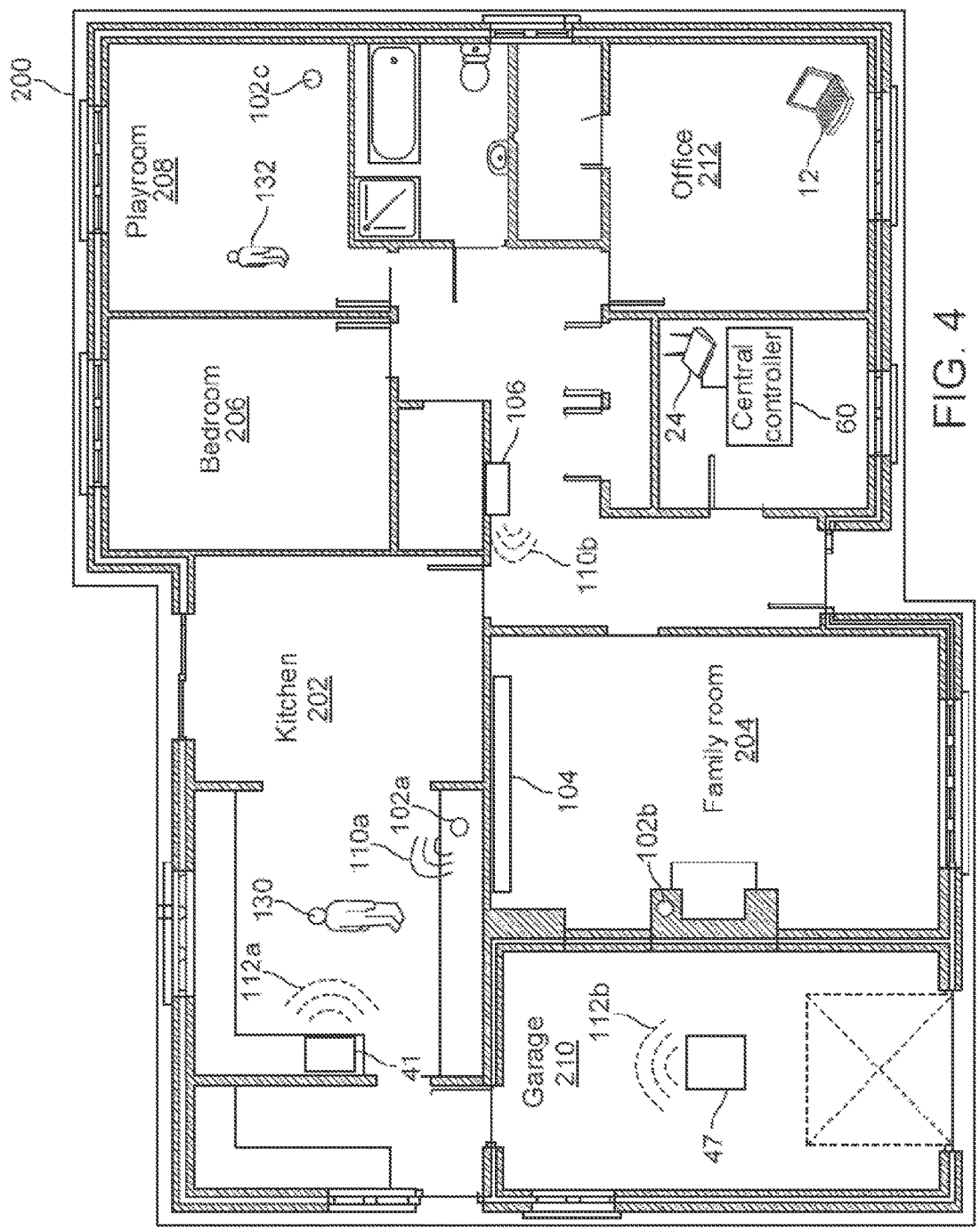
FIG. 4 is an example use case of multiple devices providing a notification to a user.

Referring to FIG. 4, with further reference to FIGS. 1-3, an example use case of multiple devices providing a notification to a user is shown. The household communication system is shown in the context of a home 200. The home 200 and the devices therein are an example of a communication system 10. The home 200 includes a kitchen 202, a family room 204, a bedroom 206, a playroom 208, a garage 210, and an office 212. The household communication system includes a home network with an access point 24 and a central controller 60 which may be the same device (e.g., the central controller 60 may include the access point 24). Example devices within the home 200 include a computer device 12 (e.g., a laptop), the oven 41, the door opener 47, a kitchen smart speaker 102a, a family room smart speaker 102b, a playroom smart speaker 102c, a television 104, and a doorbell 106. The home 200 includes a first user 130 and a second user 132. Each of the devices 12, 41, 47, 102a-c, 104, 106 may include elements of the device 70 in FIG. 3 and are configured to communicate with the central controller 60 (e.g., via the access point 24) or with one another. The devices 12, 41, 47, 102a-c, 104, 106 are configured to provide audible and/or visual indications of a notification, such as a tone, an announcement (e.g., speech), text, etc. One or more of the devices may be configured to provide a beam formed audio output. For example, the kitchen smart speaker 102a is configured to output a first directed notification 110a and the doorbell is configured to output a second directed notification 110b. Other devices may be configured to provide non-directional (e.g., standard) audio output. The oven 41 is configured to output a first non-directed notification 112a and the door opener 47 is configured to output a second non-directed notification 112b.

The following operational use cases are provided as examples to facilitate the explanation of intelligent alerts in multi-user environment. The devices 12, 41, 47, 102a-c, 104, 106 are communicating with the central controller 60 via the access point 24. The central controller 60 is configured to provide notifications such as notification messages to the devices 12, 41, 47, 102a-c, 104, 106 via a home network. In an example, the devices 12, 41, 47, 102a-c, 104, 106 may send notification messages to one another directly or via the central controller 60 via the home network. The central controller 60 is configured to receive notifications for the network users. The notifications may originate from other devices within the home network and from external sources such as email, SMS messages, or other messaging applications. The central controller 60 includes one or more data structures containing location information for each of the users in the home 200. In an example, the central controller 60 may maintain position information for the network users based on presence sensors such as acoustic and visual sensors in the networked devices (e.g., smart speakers, cameras, motion detectors, etc.). The oven 41 may be configured to detect the presence of the first user 130 based on presence detectors within the oven 41, directional microphones within the kitchen smart speaker 102a, or other presence detectors in the kitchen 202 in communication with the oven 41 or the central controller 60. The central controller 60 may receive an indication from the oven 41, kitchen smart speaker 102a, or other presence sensors, indicating the approximate location of the first user 130 and store the user's location information with the current time.

In the example depicted in FIG. 4, the central controller 60 receives a notification for the first user 130. The central controller 60 determines that the current location of the first user 130 is the kitchen 202. A more precise location of the first user 130 may be determined based on acoustic and motion information captured by the kitchen smart speaker 102a and the oven 41. The central controller 60 may be configured to maintain notification preferences for the network users to indicate how the user would like to be notified based on various conditions such as location, activity, proximity to other users, activities of other users, source of the notification, and the capabilities of the devices on the network. The central controller 60 is configured to generate a notification message based in part on the user's preferences.

The central controller 60 determines that the first user 130 in FIG. 4 will be notified by a proximate device such as the kitchen smart speaker 102a or the oven 41. Since the notification utilizes the location and preferences associated with intended recipient (i.e., first user 130), other non-interested users in the home 200 (e.g., the second user 132) will not be disturbed. A network device may be capable of generating a directed audio output. For example, the kitchen smart speaker 102a may receive a notification message containing a beam steering element and a volume element. As indicated in FIG. 4, the kitchen smart speaker 102a is configured to provide the first directed notification 110a based on the notification message. The directional notifications may further reduce the potential for disturbing the non-interested users in the home 200.

The central controller 60 maintains a target sound level for each device and each user. When a device has a notification to relay, the device may query the central controller 60 to retrieve the corresponding target sound level and provide a notification at an appropriate sound level and direction. The central controller 60 may provide notification messages to the oven 41 and the door opener 47 based on the current location of the first user 130. The oven 41 and door opener 47 may output the respective first and second non-directed notifications 112a-b. The output volume of the non-directed notifications 112a-b may vary based on the proximate location of the first user 130 to the respective device (i.e., the first non-directed notification 112a is at a lower volume than the second non-directional notification 112b). The doorbell 106 may provide the second directed notification 110b based on the location of the first user 130 (i.e., the intended recipient) as well as the location of the second user 132 (i.e., a non-interested user). The central controller 60 may send a notification message including the notification information and the appropriate direction and amplitude information to the doorbell 106. In this case, the second directed notification 110b with a narrowly focused beam (e.g., directed towards the first user 130) with a reduced volume in an effort to reduce the impact on the second user 132.

Figure 5:
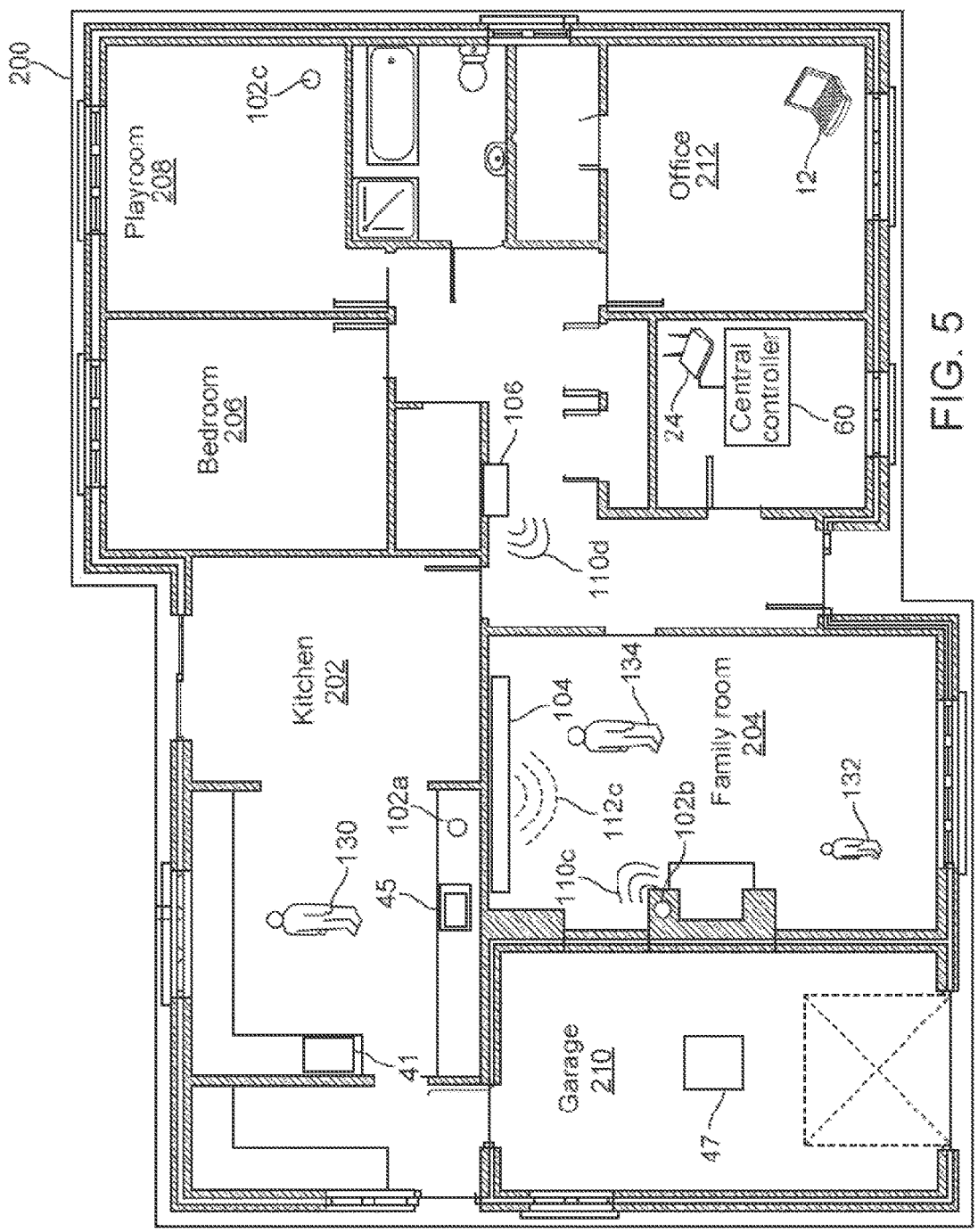
FIG. 5 is an example use case of providing a location specific notification in a multi-user environment.

Referring to FIG. 5, with further reference to FIGS. 3 and 4, an example use case of providing a location specific notification in a multi-user environment is shown. The central controller 60 may provide a notification to a user based on the user's current location in combination with location information for other users and notification preference information for the user. A third user 134 is located in the family room 204 of the home 200. The third user 134 may leave a smart phone 45 in the kitchen 202 for charging and enter the family room 204. Presence detectors in the family room 204, the family room smart speaker 102b, and/or the television 104 may provide an indication to the central controller 60 that the third user 134 is located in the family room 204, and the central controller 60 is configured to store the new location of the third user 134 with the current time. The television 104 may include a camera and a microphone and may be configured to perform image and voice recognition (i.e., local recognition). In an example, the television 104 may be a means for obtaining an image or sound data, and provide visual and acoustic information to the central controller 60 for recognition processing (e.g., remote image processing). The smart phone 45 may receive a notification for the third user 134 (e.g., email, message, alarm, request, etc.). The smart phone 45 may be configured to forward the notification information to the central controller 60 for subsequent routing to one or more appropriate network devices via one or more notification messages. In an example, the smart phone 45 may query the central controller 60 for the current location of the third user 134 and the smart phone may provide a notification message directly to one or more network devices. In an example, the central controller 60 may be configured to receive notifications for the third user 134 directly. As depicted in FIG. 5, the smart phone 45 and the third user 134 are in different locations (i.e., the kitchen 202 and the family room 204 respectively). The central controller 60 may route notifications from the smart phone 45 based on the different locations. For example, the central controller 60 may generate and send a notification message to the family room smart speaker 102b. The notification message may include beam steering and volume elements to enable the family room smart speaker 102b to produce a directed notification 110c. The central controller 60 may query one or more user location tables to determine the locations of other users in the home 200 and generate beam steering and volume elements based on those locations. In this example, the second user 132 is located in the family room 204 and the directed notification 110c is therefore aimed toward the third user 134 and at a lower volume in an effort not to disturb the second user 132.

The selection of the notification device may be constrained by user preferences. The central controller 60 may include one or more user preference tables to prioritize the notification routing based on personalized preference rules. The personal preference rules may include one or more constraints such as default notification device, device selection based on location, device selection based on notification type, device selection based on current activity, device selection based on time of day, device selection based on privacy settings, and other variables that associate a user with one or more devices. For example, referring to FIG. 5, the third user 134 may establish that the doorbell 106 is the default notification device when the user is in not in the kitchen 202. The doorbell 106 may receive a notification message with beam steering and volume components based on the third user's location 134 to generate a directed notification 110d. The default rule may be superseded by another rule to indicate that the television 104 should be used for notifications when the user is in the family room 204. The television 104 may be configured to provide a user specific notification 112c via the display or speaker system. This television selection may also be overridden by another user preference rule to indicate that a directed notification should be used when other people are collocated in the same room as the user. Thus, the central controller 60 provides the notification message to the family room smart speaker 102b. The central controller 60 and the user location and user preference tables may be used to customize the notification process.

Figure 6:
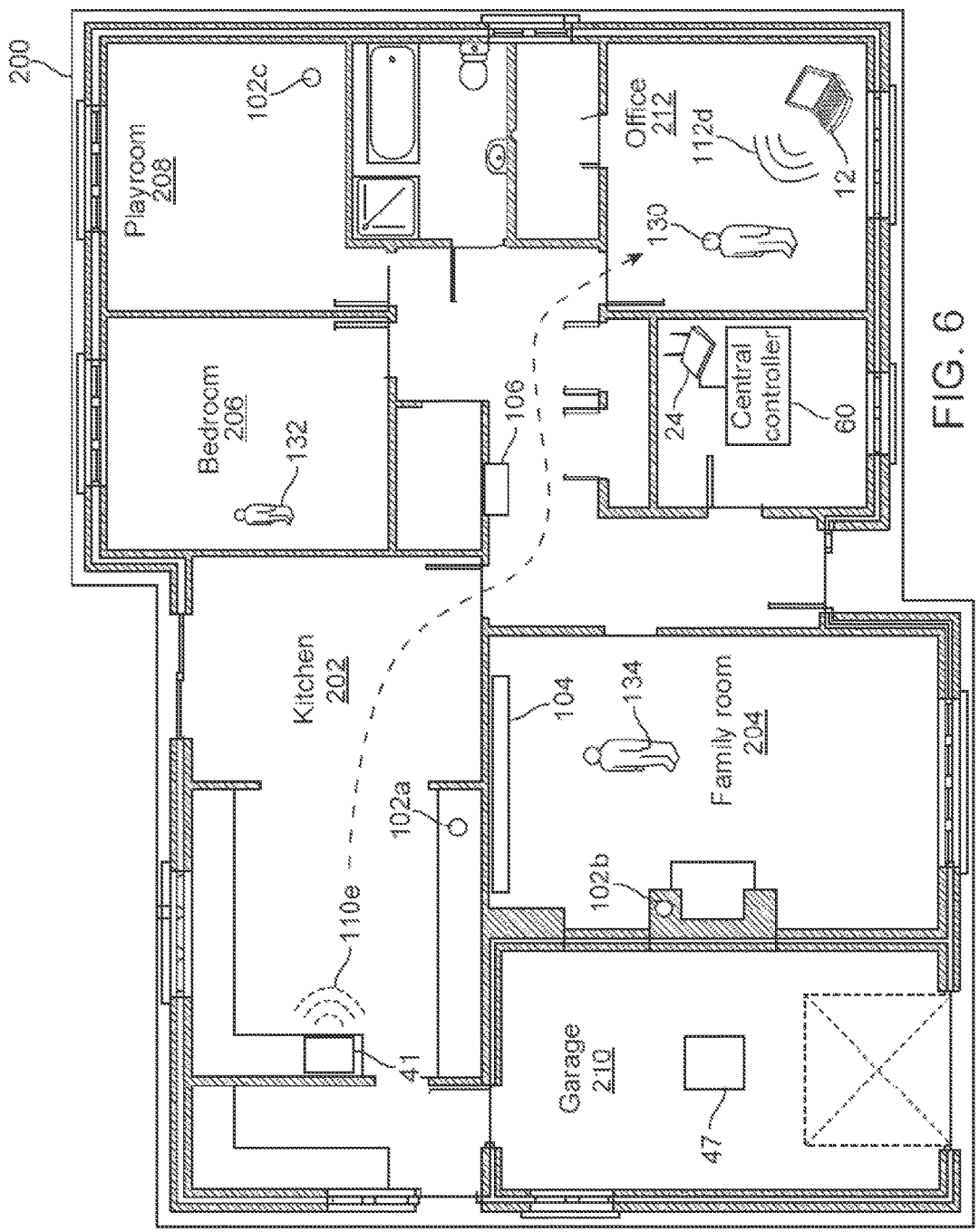
FIG. 6 is an example use case of providing an activity sensitive notification in a multi-user environment.

Referring to FIG. 6, with further reference to FIGS. 3-5, an example use case of providing an activity sensitive notification in a multi-user environment is shown. In this use case, the first user 130 sets a timer on the oven 41 and travels from the kitchen 202 to the office 212 to work on the laptop 12. When the timer has expired (e.g., reached zero), the oven 41 is configured to determine the location of the first user 130. The oven 41 may use a local presence sensor (e.g., camera) or query the central controller 60 to determine the location of the first user 130. If the user was located in the kitchen 202, the oven 41 may be configured to emit a local notification 110e. In the absence of a proximal user, the central controller 60 may be configured to send a notification message to the doorbell 106 to generate an appropriate notification message. As depicted in FIG. 6, however, a notification broadcast by the doorbell 106 may disrupt the second user 132 (currently resting in the bedroom 206), or disturb the third user 134 (currently watching the television 104 in the family room 204). The central controller 60 is configured to maintain a log (e.g., data tables) associated with the current activities of the users in the home 200. In an embodiment, the user's activities may be inferred by location, acoustic samples, device log-in information, user settings, and historical data. The activity associated with the second user 132 may be listed as resting based on the location in the bedroom and a low sound level. The activity associated with the third user may be inferred as watching television based on his location and the state of the television 104 (e.g., powered on, channel, log-in status, or other parameters). In view of the current activities of the non-interested users (e.g., the second and third users 132, 134), the central controller 60 or the oven 41 provides a notification message to the laptop 12. A notification 112d may be presented visually (via a display screen), audibly (via a speaker), tactilely (e.g., vibrating), or combinations thereof. The devices and notifications in the use cases are exemplary only and not a limitation. The central controller 60 may be configured to provide user activity and location information to other devices in a home network to enable the networked devices to exchange notification messages with one another. In an example, the central controller 60 may generate beam steering and volume elements in the notification messages based on the user activity information. The activity information may also be used in conjunction with user preferences and notification rules to provide a user with improved notification options.

Notification from a device may have different relevance and interest to each user in the home 200. For example, the central controller 60 may include a notification options table to associate a particular user with a type of notification. The type of notification may be based on the originating device or a status indication (e.g., emergency). For example, the doorbell 106 may be configured to detect the presence of a visitor (e.g., camera, button, thermal sensor, etc.). An adult user in the home 200 may be the default user for notifications associated with such a visitor. Other users may also be notified based on a priority list. In an example, facial recognition may be used to determine the identity of a visitor and direct the notification to an appropriate user. In another example, if a user places something in the oven 41, an alarm from the oven 41 is more relevant to the user. In an example, an application may be executed on a device to allow one or more users to set override options (or other specific considerations) which may be used as an input in the beam steering approach. The appropriate user may receive a notification via their smartphone or via other devices throughout the home 200 utilizing the beam steering approach as previously described. Similar users-to-notification device associations may apply to other devices such that one or more users are given priority messages (e.g., louder volume, utilize more devices) while other users are provided a notification with a lower priority (e.g., less volume, single device). Target users may be established over time based on historical use and notification data. In an example, the central controller 60 may store the parameters associated with the home network based on successful and failed notification attempts to establish default values. For example, the default value for the volume of a notification delivered by the family room smart speaker 102b may be higher when the television 104 is in use.

Figure 7:
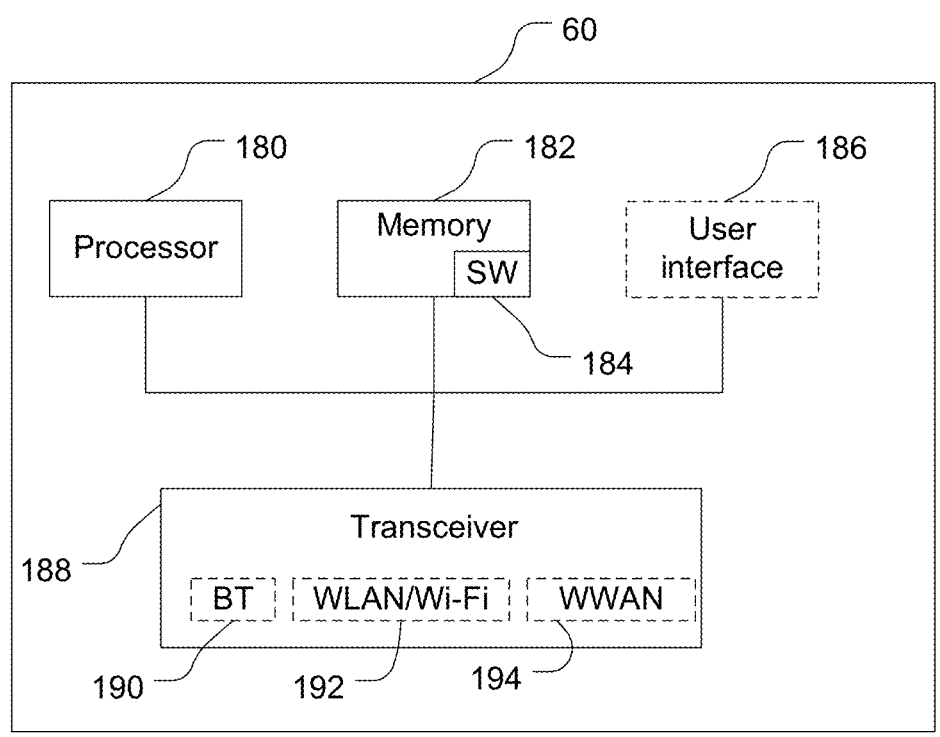
FIG. 7 is a block diagram of components of a central controller shown in FIGS. 2-6.

Referring to FIG. 7, with further reference to FIGS. 3-6, an example of the central controller 60 comprises a computer system including a processor 180, a memory 182 including software (SW) 184, an optional user interface 186, and a transceiver 188 optionally including a BLUETOOTH (BT) radio 190, a WLAN/Wi-Fi radio 192, and/or an WWAN radio 194. Other types of radios may also or alternatively be used, e.g., a BLUETOOTH-Low Energy (BT-LE) radio. The processor 180 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 180 may comprise multiple separate physical entities that can be distributed in the central controller 60. The memory 182 may include random access memory (RAM) and/or read-only memory (ROM). The memory 182 is a non-transitory, processor-readable storage medium that stores the software 184 which is processor-readable, processor-executable software code containing instructions that are configured to, when performed, cause the processor 180 to perform various functions described herein. The description may refer only to the processor 180 or the central controller 60 performing the functions, but this includes other implementations such as where the processor 180 executes software and/or firmware. The software 184 may not be directly executable by the processor 180 and instead may be configured to, for example when compiled and executed, cause the processor 180 to perform the functions. Whether needing compiling or not, the software 184 contains the instructions to cause the processor 180 to perform the functions. The processor 180 is communicatively coupled to the memory 182. The processor 180 in combination with the memory 182, the user interface 186 (as appropriate), and/or the transceiver 188 provide means for performing functions as described herein, for example, means for receiving registration information from a networked appliance, means for determining acoustic tag information for the networked appliance, and means for sending the acoustic tag information to a mobile device. The software 184 can be loaded onto the memory 182 by being downloaded via a network connection, uploaded from a disk, etc. The central controller 60 is shown in FIGS. 2, and 4-6 as a standalone device separate from the devices 12, 40-47, 102*a-c*, 104, and 106 but the central controller 60 could be implemented by one or more of the devices 12, 40-47, 102*a-c*, 104, and 106 and/or one or more other wireless communication devices such as the Wi-Fi router 24. The central controller 60 is preferably, though not necessarily, a (primarily) static device.

The processor 180 is configured to generate, store (via the memory 182), modify, and transmit (via the transceiver 188) notification messages to devices on the home network. The notification messages and corresponding device and user data may be stored and generated by other devices on the network. In an example, referring also to FIGS. 8A, 8B and 8C, the processor 180 may generate and maintain one or more user and device location/configuration tables 220, 240, 270 including indications of attributes 222, 242, 272 and respective values 224, 244, 274. The user and device configuration tables 220, 240, 270 are exemplary only and not a limitation as other tables and fields may be used. A user location table 220 includes an index 226, a start time 228 and an end time 230, a user ID 232, a user location 234, a device preference 236 and an activity 238. The index 226 may uniquely identify a record in the user location table 220. The start time 228 and the end time 230 represent the time period at which a user is in the corresponding location. The user ID 232 may include identification information to uniquely identify a user in the home network. The user location 234 describes the current location of the user. The location may be defined as a specific location (e.g., kitchen, family room, office, etc.) or as a coordinate (e.g., East North Up (ENU), latitude/longitude/altitude (LLA)). The device preference 236 includes a linking field to a preferred notification device table. In an example, the preferred device(s) 236 may be based on a current time, the user ID, the user location, and/or a current activity status. The locations and activities of other users in the home may also be used to determine a device preference. A user may be identify based on one or more of such criteria. An activity 238 may be used to identify the user's current activity such as sleeping, working, exercising, etc. An activity table may include location, sensor and user input fields associated with different user activity options.

A device status table 240 may include data fields to define the current status of a device in the home network. The device status table 240 may include an index 246, a device ID 248, a start time 250 and an end time 252, a device location 254, an acoustic status 258, and a state 260. The index 246 uniquely identifies a record in the device status table 240. The device ID 248 uniquely identifies a device in the home network. The start time and end time 250, 252 indicates the period that the corresponding data fields are valid (e.g., device location, state). The device location 254 indicates the current location of the corresponding device. The acoustic status 258 indicates the current acoustic output status of the device. For example, the acoustic status may include an indication of mute, headphone detection, beam direction, and/or a volume level. The state 260 provides an indication of the current state of the device. While only one state field is indicated in the device status table 240, additional fields or linked tables may be used. The state may indicate if the device is in communication mode (e.g., in an active call), the current applications executing on the device, the current user of the device, power mode, battery level, orientation, acceleration, and other variables that may be used to define the current state of the device.

A notification message log table 270 may be used to maintain a history of notification message variables for successful and failed notification attempts. The notification message log 270 includes an index 276, a user ID 278, a device ID 280, a priority 282, a steer vector 284, a target volume 286, and an actual volume 288. The index 276 uniquely identifies a record in the notification message log table 270. The user ID 278 indicates a user that is the intended recipient of the notification message. The device ID 280 indicates a device that received the notification message. The priority 282 provides a relative value associated with urgency of the message. The priority 282 may be used to indicate a relevance of a device alert for the user (e.g., the current user of a device, adult user in the home, pre-established user-relevance lists). The priority of a notification message may be used by the receiving device to adjust how a notification is provided to a user. For example, high priority messages may be repeated by the device at a higher frequency than lower priority messages. The steer vector 284 indicates the direction of the beam steering used by the device and the target volume 286 may indicate the initial notification volume setting used by the device. A device may be configured to repeat a notification on a periodic basis if the notification is not acknowledged by the user. The actual volume 288 may indicate the actual volume of the device when the notification was acknowledged. The actual volume 288 may be used to establish the target volume for subsequent messages.

Figure 9:
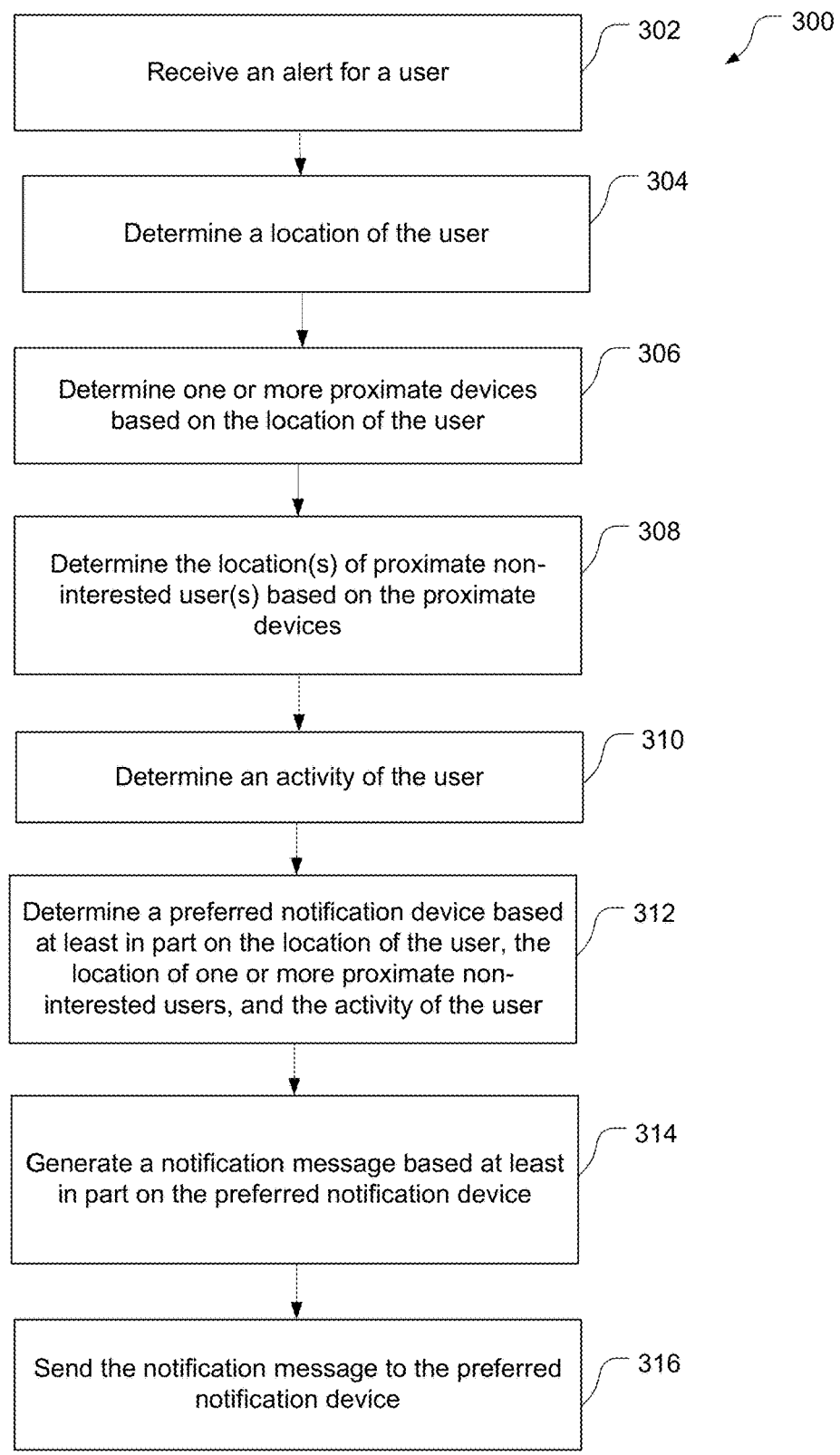
FIG. 9 is a block flow diagram of a method of providing a notification message in a multi-user environment.

Referring to FIG. 9, with further reference to FIGS. 1-8C, a method 300 for providing an notification message in a multi-user environment includes the stages shown. The method 300 is, however, an example only and not limiting. The method 300 can be altered, e.g., by having stages added, removed, rearranged, combined, performed concurrently, and/or having single stages split into multiple stages. The central controller 60 is a means for performing the elements of the method 300. The data structures are described in conjunction with the central controller 60 as an example to facilitate the explanation of intelligent alerts in a multi-user environment. The data structures may be generated by and persist on other devices 70 in the home network.

At stage 302, the method includes receiving an alert for a user. A transceiver within the central controller 60, or other device 70, may be configured to receive an alert for a user. The alert may originate from within a device (e.g., internal timer/scheduler, system monitor, alarm, etc.), from another device on the network, or from an external source (e.g., text, email, voice mail, etc.). The user may be based on a particular device such that all alerts received by a device are associated with a single user (e.g., a smart phone may be associated with a single user). A device may associate a current user as the intended recipient for an alert (e.g., an oven 41 may generate/receive alarm messages for a current user). An alert message may include an indication of the intended user (e.g., the central controller 60 may receive a text message from an external server for one of the users in the house).

At stage 304, the method includes determining a location of the user based on one or more presence sensors in the home network. For example, the central controller 60 may maintain position information for the network users based on presence sensors such as acoustic and visual sensors in the networked devices (e.g., smart speakers, cameras, motion detectors, etc.). As depicted in FIG. 4, as an example, the oven 41 may be configured to detect the presence of the first user 130 based on presence detectors within the oven 41, directional microphones within the kitchen smart speaker 102a, or other presence detectors in the kitchen 202 in communication with the oven 41 or the central controller 60. The central controller 60 may receive an indication from the oven 41, kitchen smart speaker 102a, or other presence sensors, indicating the approximate location of the first user 130 and store the user's location information with the current time. In an example, the central controller 60, or other device 70, may determine the location of the user based on records in one or more data tables. For example, the user location table 220 includes records indicating a user ID 232 and a user location 234. In an example, the central controller 60 may be configured to execute a user search function to determine the current location of a user in response to receiving the notification for the user. The central controller 60 may request input from one or more presence sensors in the home 200 (e.g., cameras, microphones) to determine a location for the user. A user table may indicate the user ID 232 based on the user as identified at stage 302.

At stage 306, the method includes determining one or more proximate devices based on the location of the user. The central controller 60, or other device 70, may utilize the user location 234 to query the device status table 240 using the device location 254 to determine one or more proximate devices. For example, the proximate devices may be based on a room identifier (e.g., in the same room as the user), or on a distance from the user (e.g., 10', 20' 50', etc.). In an example, a device 70 may send the user information from stage 302 to the central controller 60 and receive the location of the user and the one or more proximate devices. A definition for the term proximate may vary based on device types, device locations, building features, and other acoustic information. In general, a proximate device is located such that it is capable of providing a user a notification. Referring to FIG. 4, the first user 130 is an example of a user located in the kitchen 202, and the oven 41, kitchen smart speaker 102a, the garage door opener 47 and the doorbell 106 may be considered proximate devices.

At stage 308, the method includes determining the locations of one or more proximate non-interested users based on the proximate devices. The central controller 60 may perform a search query on the user location 234 of the user location table 220 based on the device locations 254 for the one or more proximate devices in stage 304. A proximate non-interested user is defined as a user that is located near a notification device (e.g., the same room, a next room, 10', 20', 50', etc.) and could receive a notification from one or more of the proximate devices determined at stage 304, but is not the intended recipient of the notification. Referring again to the use case in FIG. 4, the first user 130 is the intended recipient of the notification received at stage 302 and the second user 132 is a non-interested user. The doorbell 106 is a proximate device based on the location of the first user 130 and the second user 132 is a proximate non-interested user based the distance from the second user 132 to the doorbell 106.

At stage 310, the method includes determining an activity of the user. The current activity may be based on an inference engine executing on the central controller 60 or another networked (e.g., remote) processor. In an example, the activities of users may be tracked based on wearable devices, the user's proximity to other devices (e.g., washing machine, stove, television, etc.), or based on calendar events. In another example, a device 70 may utilize a microphone 81 to obtain an audio sample of the environment. For example, the audio samples may be approximately 10 to 50 ms at a frequency of 1-20 Hz. A processor may compute a Mel-Frequency Cepstral Coefficient (MFCC) for the audio samples and compare the results to previously generated activity clusters associated with the sounds generated during different activities. The inference engine is configured to provide the user activity based on the audio samples. For example, the audio sample may detect activities such as typing, talking, exercising, watching TV/listening, or resting. Other audio sampling techniques may also be used. Cameras and motion detectors may also be used to determine a user's activity (e.g., light/dark, in motion/ standing still). In an example, the state of a device may be used to infer a user's current activity. The operation of a burner on the oven 41 may indicate a user is cooking, streaming audio on the family room smart speaker 102b may indicate a user is listening to music, operating a browser on the laptop 12 may indicate the user is working. Other sensors and device input may be used to generate a current activity for a user.

At stage 312, the method includes determining a preferred notification device based at least in part on the location of the user, the location of one or more proximate non-interested users, and the activity of the user. The central controller 60, or a device 70, may be configured to query a preferred devices table based on location of the user, the location of the non-interested users and the activity of the user. In an example, the preferred devices may be based on a distance from the user's current location such that an initial list including the closest devices is created. This list may be narrowed based on the locations of the non-interested users such that the devices that are furthest from the non-interested users remain on the list. The preferred notification device may be selected based on other user configuration data. For example, a user's current activity may be used to identify one or more preferred devices. In operation, referring to FIG. 4, the first user 130 is an example of an intended recipient of an alert. The first user 130 is located in the kitchen and the proximate devices include the oven 41, the kitchen smart speaker 102a and the doorbell 106. The second user 132 is an example of a non-interested user that is proximate to the doorbell 106. Thus, the doorbell 106 is given lower weight as a potential preferred device. In this example, the user's activity is cooking (e.g., the stove is operating) and the oven 41 is given preference over the kitchen smart speaker 102a as the preferred notification device. Other user preferences may be used to determine a preferred device.

At stage 314, the method includes generating a notification message based at least in part on the preferred notification device. The central controller 60, or a device 70, may be configured to generate a notification message based on the capabilities of the preferred device. For example, the notification message may include one or more 802.11 Media Access Control (MAC) frames to transport the notification content and corresponding announcement parameters (e.g., volume, text, chime sound, voice quality, etc.). In an example, the volume may be based on a previously determined target sound level associated with the user and the preferred device. In general, a notification message includes device specific parameters/data in addition to the notification information to enable the target device to provide the notification to a user. The format and content of the notification message may be modified based on user preferences. For example, users may be associated with a pre-message tone or chime, or text messages may be preferred over audio message on some devices (e.g., television, gaming consoles, etc.).

At stage 316, the method includes sending the notification message to the preferred device. The central controller 60, or a device 70, sends the notification message to the preferred device. The central controller 60 may utilize network transport protocols associated with the devices on the system 10 to provide a notification message containing information elements associated with the preferred device and the user. The notification may be a tone, a text-to-speech, or other audio indications. The notification may have audio and video components (e.g., display text, flashing lights, icons, colored lamps, etc.) as appropriate for the device. The notification message may include information elements to instruct the device to repeat the notification at different intervals and different volumes. In an example, the one or more preferred devices may provide the notification in a cascading order (i.e., one device after another). For example, the kitchen smart speaker 102a may provide the notification, and then the doorbell 106 may provide the notification. A preferred device may receive an acknowledgment from the user to confirm receipt of the notification. The acknowledgment at one device may stop any cascading notifications on the other device. The parameters for the notification when acknowledged may be stored and used in subsequent notification messages.

In an example, the method 300 may include calculating a target sound level for each of the proximate devices based at least in part on the location of the one or more proximate non-interested users. The central controller 60, or other device 70, may be configured to maintain a target sound level for each device and each user. A target sound level may include a volume element based on a default volume or may be based on previously determined target sound levels. A transfer function for a speaker for a particular device may be described as:

$$A(f)=HB(f)$$

where:
  A(f) is the output audio response from the device
  H is a beam steering element (acoustic steer vector)
  B(f) is a volume element (e.g., audio/Emi/p to the speaker)

For 'N' users and 'M' devices in a home network, target sound levels for each user $T_1, T_2, \ldots T_N$ are obtained for each device. The beam steering and volume elements may be used to minimize the norm:

$$\|A(f)-T\|$$

A suitable norm order may be approximated based on a simulation. A target sound level ($T_i=[T_1, T_2, \ldots T_N]$) may be obtained and updated for the devices on the network with $1 \leq i \leq M$ based on the notification.

When a device has a notification to relay, the device may query the central controller 60 to retrieve the corresponding target sound level and provide a notification at an appropriate sound level. Conversely, in the case of a non-interested user, the central controller 60 may ensure that a device that is proximate to a non-interested user does not provide a notification message at a sound level that would meet or exceed the a target sound level for the non-interested user. The central controller 60 may be configured to retrieve the target sound level for each of the proximate devices based on the user to be notified. The central controller 60 may then determine the target sound levels for each of the devices and the non-interested users. If the target sound level for the user is higher than (e.g., louder) than the target sound level for the non-interested user, then the target sound level for the current notification is set to zero (i.e., the device will not use an acoustic method to notify the user). If the target sound level for the user is lower than (e.g., softer) than the target sound level for the non-interested user, then the central controller 60 may determine a difference value between the user's target sound level and the non-interested user's target sound level. If a non-interested user is not proximate to a notification device, then the difference value is the user's target sound level. The difference values for each of the proximate devices and the non-interested users may be averaged for each of the proximate devices. In an example, the proximate devices with the highest average differences value may be selected as the notifying devices and the target sound levels are based on the user's target sound levels for the respective devices. In an example, the target sound levels for the user and non-interested users may be modified based on an estimated distance to a proximate device (e.g., the further away from a device, the louder the target sound level).

In an example, the target sound level may be based on the activity of the users (e.g., the user to be notified and any non-interested users). A user preference may be used to indicate an increased target sound level for activities with high ambient noise (e.g., exercising, watching television, piano practice), and a lower target sound level for activities with lower ambient noise levels (e.g., sleeping, reading, gardening). The user location table 220 may be linked to the notification message log 270 to determine the target sound level for a user activity. For example, the actual volume 288 associated with a userID 278, deviceID 280 for a notification may be linked to an activity 238 via a timestamp. The most recent actual volume 288 for a given user, device and activity may be the target sound level for a new notification message.

A notification message may be generated based on the target sound level. The central controller 60, or a device 70, generates a notification message including attributes and preferences associated with the one or more proximate devices. In an example, the notification message may include one or more 802.11 Media Access Control (MAC) frames to transport the beam steering element and the volume element. A notification message may include device specific parameters/data in addition to the notification information to enable the target device to provide the notification to a user. The notification message may include a beam steering element and a volume element. The notification message may include address information, priority fields, and announcement and display parameters. For example, a notification message for a displayed notification may be different than a notification message directed to an audio notification device. The beam steering element may include bearing and beam width components based on the location of a device and the locations of the user and the proximate non-interested users. The central controller 60 is configured to determine an appropriate bearing (e.g., towards the user from the device, away from the non-interested users). A beam width element may be used to reduce the coverage of the audio output based on bearings from the device to the non-interested users.

Figure 10:
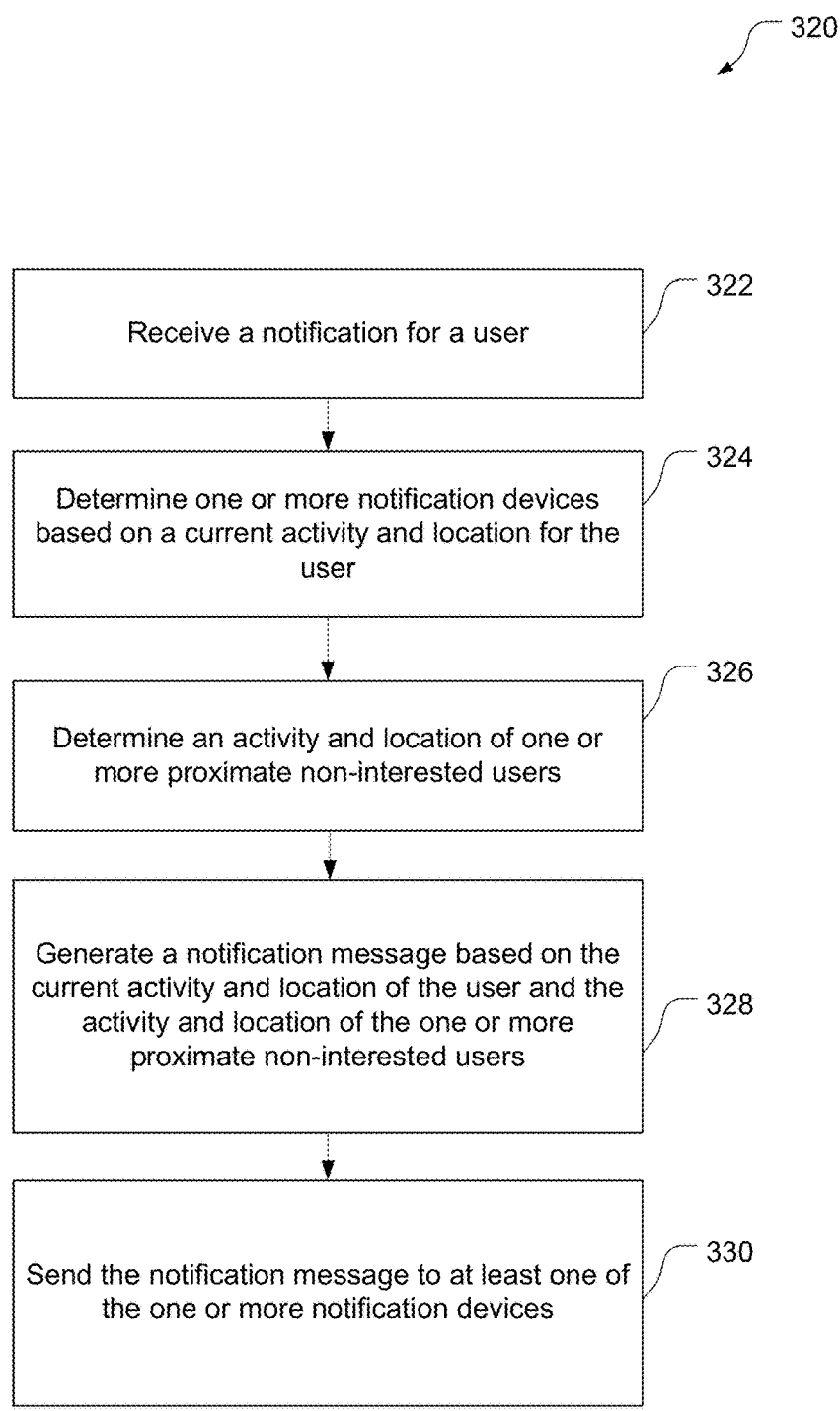
FIG. 10 is a block flow diagram of method of providing a notification message based on user activities.

Referring to FIG. 10, with further reference to FIGS. 1-8C, a method 320 for providing an notification message based on user activities includes the stages shown. The method 320 is, however, an example only and not limiting. The method 320 can be altered, e.g., by having stages added, removed, rearranged, combined, performed concurrently, and/or having single stages split into multiple stages. The central controller 60 and/or a device 70 are means for performing the elements of the method 320.

At stage 322, the method includes receiving a notification for a user. The central controller 60, or other device 70, receives a notification for a user. The notification may originate from within a device (e.g., internal timer/scheduler, system monitor, alarm, etc.), from another device on the network, or from an external source (e.g., text, email, voice mail, etc.). The target user may be based on a particular device such that all notifications received by a device are associated with a single user (e.g., a smart phone may be associated with a single user). A device may associate a current user as the intended recipient for a notification. For example, referring to FIG. 6, the first user 130 may be currently using the oven 41 and the oven 41 may generate/receive alarm messages for the first user 130 based on an alarm status (e.g., timer, pre-heat, smoke, etc.).

At stage 324, the method includes determining one or more notification devices based on a current activity and location for the user. The central controller 60, or other device 70, determines the activity and location of the user based on records in one or more data tables. For example, the user location table 220 includes records indicating a user ID 232, a user location 234 and a user activity 238. A user table may indicate the user ID 232 based on the user as identified at stage 322. The user location 234 and the activity 238 may be used to determine one or more preferred devices (i.e., the notification devices). The current activity may be based on an inference engine executing on the central controller 60 or another networked (e.g., remote) processor. In an example, the activities of users may be tracked based on wearable devices, the user's proximity to other devices (e.g., washing machine, stove, television, presence sensors, etc.), or based on calendar events. In another example, a device 70 may utilize a microphone 81 to obtain an audio sample of the environment. For example, the audio samples may be approximately 10 to 50 ms at a frequency of 1-20 Hz. A processor may compute a Mel-Frequency Cepstral Coefficient (MFCC) for the audio samples and compare the results to previously generated activity clusters associated with the sounds generated during different activities. The inference engine is configured to provide the user activity 238 based on the audio samples. For example, the audio sample may detect activities such as typing, talking, exercising, watching TV/listening, or resting. Other audio sampling techniques may also be used. Cameras and motion detectors may also be used to determine a user's activity (e.g., light/dark, in motion/standing still). In an example, the state of a device may be used to infer a user's current activity. The operation of a burner on the oven 41 may indicate a user is cooking, streaming audio on the family room smart speaker 102*b* may indicate a user is listening to music, operating a browser on the laptop 12 may indicate the user is working. Other sensors and device input may be used to generate a current activity for a user.

A user preference table on the central controller 60 may be used to indicate a user's preferred notification device and corresponding device settings based on their current activity. For example, if a user is cooking, the preferred notification devices are the oven 41, the kitchen smart speaker 102*a* and the doorbell 106. In an example, a preferred notification device may be based on the current location and an activity of the user. A user in the family room 204 may prefer notification via the television 104 while watching television, and via the family room smart speaker 102*b* when the television is off.

At stage 326, the method includes determining an activity and location of one or more proximate non-interested user. The central controller 60 or a device 70 determines the activities and locations of the other users in the home 200. The central controller 60 may perform a search query on the user location 234 of the user location table 220 based on the device locations 254 for the one or more notification devices determined at stage 324. A proximate non-interested user is defined as a user that is located near a notification device (e.g., the same room, a next room, 10', 20', 50', etc.) and could receive a notification from one or more of the proximate devices determined at stage 324, but is not the intended recipient of the notification. Referring again to the use case in FIG. 6, the first user 130 is the intended recipient of the notification received at stage 322 and the second user 132 is a non-interested user. The location of the second user 132 in the bedroom 206 and the current activity indicates the second user 132 is resting.

At stage 328, the method includes generating a notification message based on the current activity and location of the user and the activity and location of the one or more proximate non-interested users. In an example, the central controller 60, or a device 70, may compute a first set of proximate devices based on the location of the user, and a second set of proximate devices based on the locations of the non-interest users. A difference between the first and second sets of devices may be determined based on the resting status of the non-interested users, such that the resulting set of device excludes the devices that are proximate to a resting non-interested user. The resulting set of devices may be further filtered based on the activity of the user to determine one or more notification devices. Referring to FIG. 6, the doorbell 106 is proximate to both the first user 130 and the second user 132. Since the second user is resting, the doorbell 106 is removed as a notification device for the first user 130. Since the first user 130 is located in the office 212 and is currently working on the laptop 12, the laptop is determined to be the notification device. In this example, the central controller 60, or a device 70, generates a notification message including attributes and preferences associated with the laptop 12. The notification message may include one or more 802.11 Media Access Control (MAC) frames to transport the notification and corresponding announcement parameters (e.g., volume, text, chime sound, voice quality, etc.). In general, a notification message includes device specific parameters/data in addition to the notification information to enable the target device to provide the notification to a user.

At stage 330, the method includes sending the notification message to at least one of the one or more proximate devices. The central controller 60, or a device 70, sends a notification message to at least one of the one or more notification devices determined at stage 328. The central controller 60 may utilize network transport protocols associated with the devices on the system 10 to provide a notification message containing the corresponding notification information. The notification may have audio and video components (e.g., chimes, voice, display text) as appropriate for the device.

Figure 11:
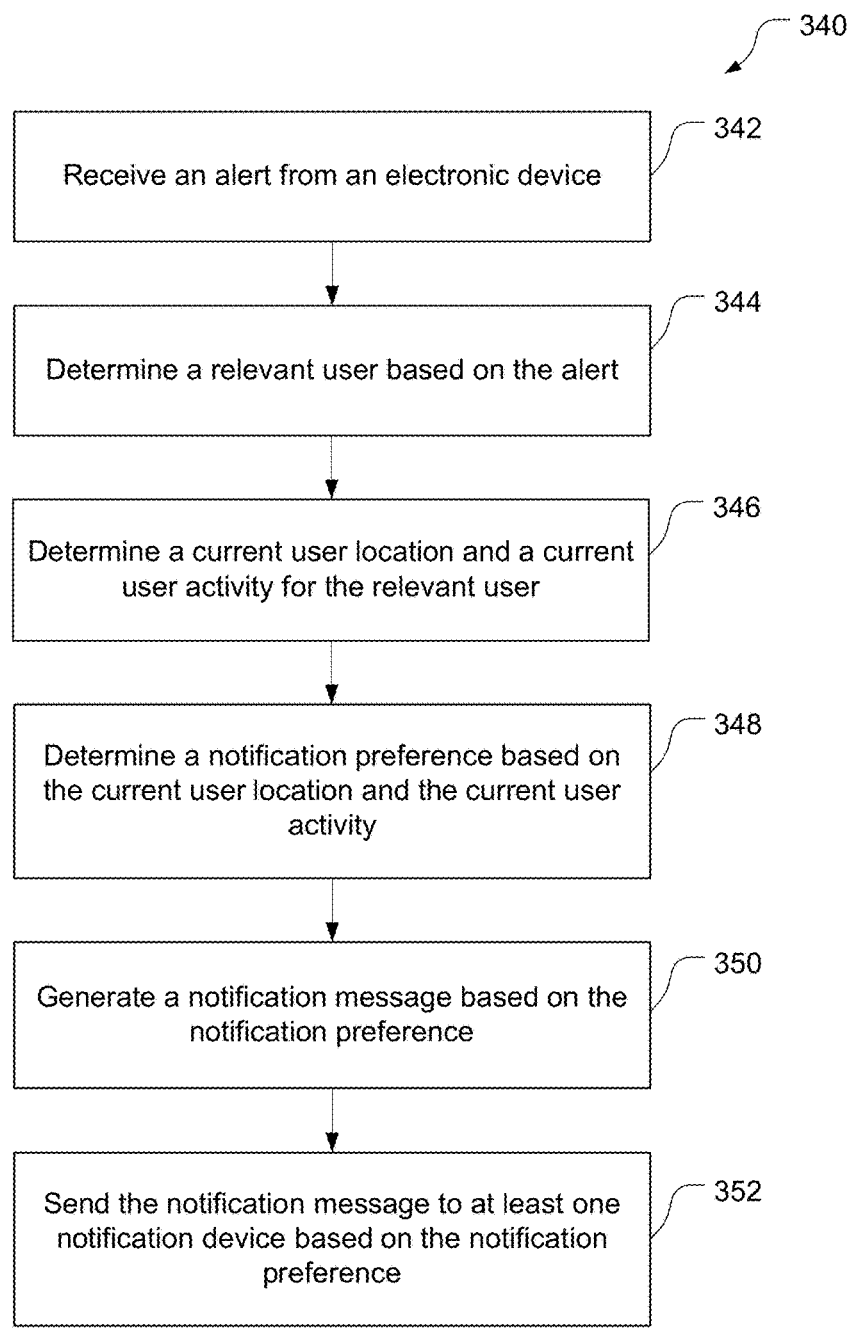
FIG. 11 is a block flow diagram of a method of providing a notification message to a relevant user.

Referring to FIG. 11, with further reference to FIGS. 1-8C, a method 340 for providing a notification message to a relevant user includes the stages shown. The method 340 is, however, an example only and not limiting. The method 340 can be altered, e.g., by having stages added, removed, rearranged, combined, performed concurrently, and/or having single stages split into multiple stages. The central controller 60 is a means for performing the elements of the method 340. The data structures are described in conjunction with the central controller 60 as an example to facilitate the explanation of intelligent alerts in a multi-user environment. The data structures may be generated by and persist on other devices 70 in the home network.

At stage 342, the method includes receiving an alert from an electronic device. A transceiver in the central controller 60, or other device 70 on the home network, is configured to receive an alert signal from another device on the network. The alert may be associated with a user programmable function (e.g., kitchen timer), a system state (e.g., clothes dryer cycle complete), program event (e.g., download complete), or other triggers which may require user attention.

At stage 344, the method includes determining a relevant user based on the alert. The central controller 60 may include a device associate table to correlate network users with network devices or alert information. For example, the first user 130 may be correlated with oven 41 such that an alert generated by the oven 41 will be directed to the first user 130. Additional users may also be correlated with the oven and the central controller 60 may be configured to alert the additional users if the first user 130 cannot be located or does not respond to a notification. In an example, the doorbell 106 may be configured with a camera to obtain an image of a visitor and provide the image as an alert. Facial recognition algorithms operating in the central controller 60 may be used to determine the identity of the visitor. The central controller 60 may be configured to determine the relevant user based on the results of the image recognition. The central controller 60 may also use other information to determine the relevant user such as override and/or priority fields associated with the signaling device.

At stage 346, the method includes determining a current user location and a current user activity of the user and one or more proximate devices. The central controller 60, or other device 70, determines the location and activity of a user based on records in one or more data tables. For example, the user location table 220 includes records indicating a user ID 232 and a corresponding user location 234 and activity 238. In an example, the activities of users can be tracked using wearables, proximity to a particular device or by using the user's calendar events. The central controller 60 may maintain the user location 234 information based on input from presence sensors and other device status information (e.g., current user, acoustic bearing). The user location 234 may be updated periodically (e.g., 1 sec, 5 sec, 20 secs, etc.) and may be updated based on triggering events such as an initial detection of a user by one or more sensors or devices.

At stage 348, the method includes determining a notification preference based on the current user location and the current user activity. The central controller 60 may include one or more device preference tables including attribute fields such as a device ID, a user ID, a user location and an activity. The device preferences tables enable a user to configure notifications preferences based on location and activity. For example, referring to FIG. 5, the third user 134 may have a preference of receiving notifications from the television 104 when the activity is watching television, or receiving notifications via the family room smart speaker 102b when non watching television. The device preference table may also include device specific parameter information to enable a user to define the notification characteristics based on location and activity parameters. Notification characteristics may include volume, beam direction, display, chimes, and other programmable device specific capabilities. Other combinations of devices and corresponding notification preferences may be associated with locations and activities of the users.

At stage 350, the method includes generating a notification message based on the notification preference. The central controller 60, or a device 70, generates a notification message including the attributes and preferences determined at stage 348. In an example, the notification message may include one or more 802.11 Media Access Control (MAC) frames to transport one or more information elements including device specific parameters/data to enable the target device to provide the notification to a user based on the notification preferences. The central controller 60 may generate notification messages for multiple devices based on a user's preferences. For example, referring to FIG. 4, the first user 130 may indicate that the oven 41 and the kitchen smart speaker 102a provide notification when the first user 130 is active in the kitchen 202. The user's preferences may also include override options set by the user to explicitly indicate alarm types (e.g., tones, content, duration) and beam steering parameters (e.g., volume, beam width).

At stage 352, the method includes sending the notification message to at least one of the notification devices based on the notification preference. The central controller 60, or a device 70, sends the notification message to at least one notification device using a network protocol (e.g., 802.11, BT-LE). A notification device is configured to transform the notification message to an appropriate notification for the user. The notification may have audio and video components (e.g., display text, flashing lights, icons, colored lamps) as desired by the previously entered user notification preferences. In an example, a user's notification preferences may persist on a device and the notification message may be an indication to active a notification for the user (i.e., the device output being based on the previously stored user notification preferences).

Figure 12:
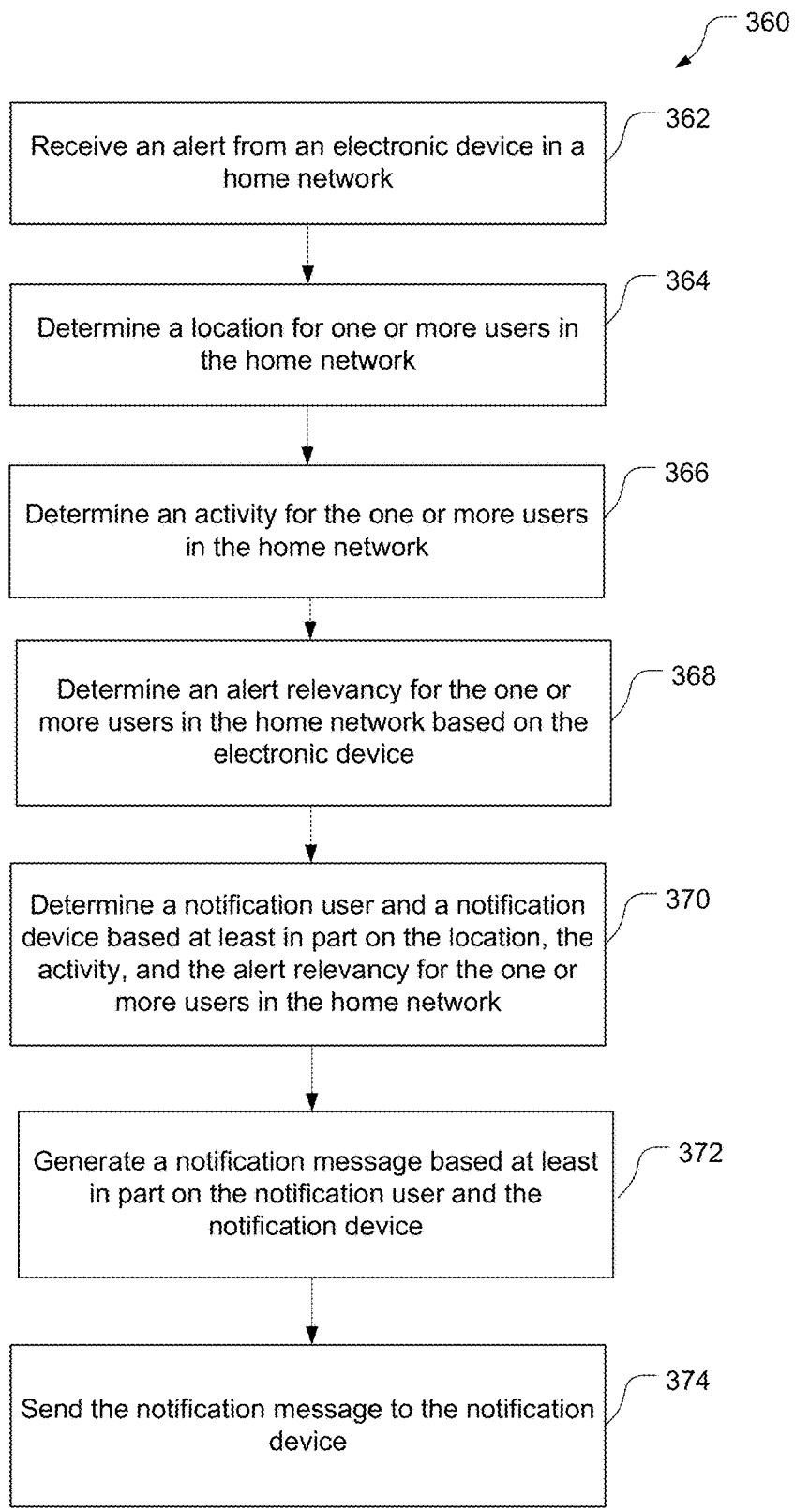
FIG. 12 is a block flow diagram of a method of providing a notification message to a selected user.

Referring to FIG. 12, with further reference to FIGS. 1-8C, a method 360 for providing a notification message to a selected user includes the stages shown. The method 360 is, however, an example only and not limiting. The method 360 can be altered, e.g., by having stages added, removed, rearranged, combined, performed concurrently, and/or having single stages split into multiple stages. The central controller 60 is a means for performing the elements of the method 360. The data structures are described in conjunction with the central controller 60 as an example to facilitate the explanation of intelligent alerts in a multi-user environment. The data structures may be generated by and persist on other devices 70 in the home network.

At stage 362, the method includes receiving an alert from an electronic device in a home network. The central controller 60, or other device 70 on the home network, receives an alert signal from another device on the network. The alert may be associated presence sensor such as a doorbell or security camera, or with other programmable functions, a system states, program events, or other system events within the home network which may require user attention.

At stage 364, the method includes determining a location for one or more users in the home network. In an example, the central controller 60, or other device 70, determines the location of the home network users based the user location table 220. The central controller 60 may maintain the locations of the users based on input from presence sensors and other device status information (e.g., current user, acoustic bearing). The locations of the users may be updated periodically (e.g., 1 sec, 5 sec, 20 secs, etc.) and/or based on triggering events such as an initial detection of a user by one or more sensors or devices.

At stage 366, the method includes determining an activity for one or more of the users in the home network. The central controller 60, or other device 70, determines the activities of the users based on records in one or more data tables. For example, the user location table 220 includes records indicating user IDs 232 and user activities 238. The activities for the users may be based on results from an inference engine executing on the central controller 60 or another networked (e.g., remote) processor. In an example, the activities of users may be tracked based on wearable devices, the user's proximity to other devices (e.g., washing machine, stove, television, presence sensors, etc.), or based on calendar events. In another example, a device 70 may utilize a microphone 81 to obtain an audio sample of the environment. For example, the audio samples may be approximately 10 to 50 ms at a frequency of 1-20 Hz. A processor may compute a Mel-Frequency Cepstral Coefficient (MFCC) for the audio samples and compare the results to previously generated activity clusters associated with the sounds generated during different activities. The inference engine is configured to provide the user activity based on the audio samples. For example, the audio sample may detect activities such as typing, talking, exercising, watching TV/listening, or resting. Other audio sampling techniques may also be used. Cameras and motion detectors may also be used to determine a user's activity (e.g., light/dark, in motion/standing still). In an example, the state of a device may be used to infer a user's current activity. The operation of a burner on the oven 41 may indicate a user is cooking, streaming audio on the family room smart speaker 102b may indicate a user is listening to music, operating a browser on the laptop 12 may indicate the user is working. Other sensors and device input may be used to determine the activities for the users in the network.

At stage 368, the method includes determining an alert relevancy for one or more users in the home network based on the electronic device. The central controller 60 may include a device associate table to correlate network users with preferred notification device. For example, each device in the network may have a prioritized list of users to be notified when the device send an alert. Other correlations between an alert from an electronic device and the users may be used to determine the relevancy of the alert to one or more users. For example, a security system and/or the doorbell 106 may be configured with a camera to obtain an image of a visitor and provide the image as an alert. Facial recognition algorithms operating in the central controller 60 may be used to determine the identity of the visitor. The central controller 60 may be configured to determine the relevant user based on the results of the image recognition. For example, in an multifamily dwelling, a security system or scanning system may be configured to capture the address information on packages left at the front door (e.g., via bar code information, optical character recognition), and the central controller 60 may be configured to determine the relevant user based on the address information.

At stage 370, the method includes determining a notification user and a notification device based at least in part on the location, the activity and the alert relevancy for the one or more users in the home network. The central controller 60, or a device 70, may be configured to query one or more location/configuration tables 220, 240, 270 to determine the notification user and the notification device. In an example, referring to FIG. 4, the central controller 60 may receive an alert from the doorbell 106 indicating that a guest is at the front door. The first user 130 may be the default user (e.g., relevant user) to be notified for all approaching guests. The user location table 220 may include a record indicating that the first user 130 is located in the kitchen 202 and is currently cooking (e.g., because the 41 was activated by the first user 130). The central controller 60 may include a user preference table to indicate that the preferred notification device for the first user 130 is the oven 41 when the first user 130 is in the kitchen 220 and engaging in a cooking activity. In this example, the first user 130 is the notification user and the oven 41 is the notification device.

At stage 372, the method includes generating a notification message based at least in part on the notification user and the notification device. The central controller 60, or a device 70, may be configured to generate a notification message based on the capabilities of the notification device and the preferences of the notification user. The notification message may include one or more 802.11 Media Access Control (MAC) frames to transport the notification content and corresponding announcement parameters (e.g., volume, text, chime sound, voice quality, etc.). In an example, the volume may be based on a previously determined target sound level associated with the notification user and the notification device. A notification message may include device specific parameters/data in addition to the notification information to enable the target device to provide the notification to the notification user. The format and content of the notification message may be modified based on preferences associated with the notification user. For example, the notification user may be associated with a pre-message tone or chime, or text messages may be preferred over audio message on some devices (e.g., television, gaming consoles, etc.).

At stage 374, the method includes sending the notification message to the notification device. The central controller 60, or a device 70, may utilize network transport protocols associated with the devices on the system 10 to send the notification message to the notification device.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium," "computer-readable medium," and "non-transitory processor-readable storage medium" as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of providing a notification to a user in a home network, comprising:
   receiving, at a communication device, an alert for the user;
   determining, by the communication device, a location of the user;
   determining, by the communication device, one or more proximate devices based on the location of the user;
   determining, by the communication device, a location of one or more proximate non-interested users based on the proximate devices;
   determining, by the communication device, an activity of the user;
   determining, by the communication device, a preferred notification device based at least in part on the location of the user, the location of one or more proximate non-interested users, and the activity of the user;
   generating, by the communication device, a notification message for the user based at least in part on the preferred notification device and the alert; and
   sending, by the communication device, the notification message to the preferred notification device.

2. The method of claim 1 wherein determining the location of the user is based on one or more presence sensors in the home network.

3. The method of claim 1 further comprising:
   calculating, by the communication device, a target sound level for the preferred notification device based at least in part on the location of the one or more proximate non-interested users; and
   generating, by the communication device, the notification message based at least in part on the target sound level.

4. The method of claim 3 wherein the target sound level includes a beam steering element and a volume element.

5. The method of claim 4 wherein the volume element is based at least in part on the user.

6. The method of claim 1 further comprising:
   determining, by the communication device, an activity for each of the one or more proximate non-interested users; and
   calculating, by the communication device, a target sound level for each of the proximate devices based at least in part on the activity for each of the one or more proximate non-interested users.

7. The method of claim 1 wherein the communication device is a central controller.

8. The method of claim 1 wherein the notification message includes one or more information elements configured to cause a device to display the notification message to the user.

9. An apparatus for providing a notification to a user in a home network, comprising:
   a transceiver configured to receive an alert for the user; and
   at least one processor operably coupled to the transceiver and configured to:
   determine a location of the user;
   determine one or more proximate devices based on the location of the user;
   determine a location of one or more proximate non-interested users based on the proximate devices;
   determine an activity of the user;
   determine a preferred notification device based at least in part on the location of the user, the location of one or more proximate non-interested users, and the activity of the user;
   generate a notification message for the user based at least in part on the preferred notification device and the alert; and
   send the notification message to the preferred notification device.

10. The apparatus of claim 9 wherein the at least one processor is operably coupled to one or more presence sensors in the home network.

11. The apparatus of claim 9 wherein the at least one processor is further configured to:
   calculate a target sound level for the preferred notification device based at least in part on the location of the one or more proximate non-interested users; and
   generate the notification message based at least in part on the target sound level.

12. The apparatus of claim 11 wherein the target sound level includes a beam steering element and a volume element.

13. The apparatus of claim 12 wherein the volume element is based at least in part on the user.

14. The apparatus of claim 9 wherein the at least one processor is further configured to:
   determine an activity for each of the one or more proximate non-interested users; and
   calculate a target sound level for each of the proximate devices based at least in part on the activity for each of the one or more proximate non-interested users.

15. The apparatus of claim 9 wherein the notification message includes one or more information elements configured to cause a device to display the notification message to the user.

16. An apparatus for providing a notification to a user in a home network, comprising:
   means for receiving an alert for the user;
   means for determining a location of the user;
   means for determining one or more proximate devices based on the location of the user;
   means for determining a location of one or more proximate non-interested users based on the proximate devices;
   means for determining an activity of the user;
   means for determining a preferred notification device based at least in part on the location of the user, the location of one or more proximate non-interested users, and the activity of the user;
   means for generating a notification message for the user based at least in part on the preferred notification device and the alert; and
   means for sending the notification message to the preferred notification device.

17. The apparatus of claim 16 wherein the means for determining the location of the user includes means for detecting the presence of the user.

18. The apparatus of claim 16 further comprising:
   means for calculating a target sound level for the preferred notification device based at least in part on the location of the one or more proximate non-interested users; and means for generating the notification message based at least in part on the target sound level.

19. The apparatus of claim 18 wherein the target sound level includes a beam steering element and a volume element.

20. The apparatus of claim 19 wherein the volume element is based at least in part on the user.

21. The apparatus of claim 16 further comprising:
means for determining an activity for each of the one or more proximate non-interested users; and
means for calculating a target sound level for each of the proximate devices based at least in part on the activity for each of the one or more proximate non-interested users.

22. The apparatus of claim 16 wherein the notification message includes one or more information elements configured to cause a device to display the notification message to the user.

23. A method for providing a notification to a user in a home network, comprising:
receiving, at a communication device, an alert from an electronic device;
determining, by the communication device, a location for one or more users in the home network;
determining, by the communication device, an activity for the one or more users in the home network;
determining, by the communication device, an alert relevancy for the one or more users in the home network based on the electronic device;
determining, by the communication device, a notification user and a notification device based at least in part on the location, the activity, and the alert relevancy for the one or more users in the home network;
generating, by the communication device, a notification message for the notification user based at least in part on the notification user, the notification device, and the alert; and
sending, by the communication device, the notification message to the notification device.

24. The method of claim 23 wherein determining the location of the one or more users is based on one or more presence sensors in the home network.

25. The method of claim 23 wherein the electronic device is a security system configured to determine an identity of a visitor, and wherein determining the alert relevancy for the one or more users in the home network is based at least in part on the identity of the visitor.

26. The method of claim 23 further comprising:
calculating, by the communication device, a target sound level for the notification device based at least in part on the notification user; and
generating, by the communication device, the notification message based at least in part on the target sound level.

27. The method of claim 26 wherein the target sound level includes a beam steering element and a volume element.

28. The method of claim 23 wherein the communication device is a central controller.

29. The method of claim 23 wherein the notification message includes one or more information elements configured to cause a display screen to display the notification message to the user.

30. An apparatus for providing a notification to a user in a home network, comprising:
a transceiver configured to receive an alert from an electronic device; and
at least one processor operably coupled to the transceiver and configured to:
determine a location for one or more users in the home network;
determine an activity for the one or more users in the home network;
determine an alert relevancy for the one or more users in the home network based on the electronic device;
determine a notification user and a notification device based at least in part on the location, the activity, and the alert relevancy for the one or more users in the home network;
generate a notification message for the notification user based at least in part on the notification user, the notification device, and the alert; and
send the notification message to the notification device.

31. The apparatus of claim 30 wherein the at least one processor is configured to determine the location of the one or more users is based at least in part on data obtained from one or more presence sensors in the home network.

32. The apparatus of claim 30 wherein the electronic device is a security system configured to determine an identity of a visitor, and the at least one processor is configured to determine the alert relevancy for the one or more users in the home network is based at least in part on the identity of the visitor.

33. The apparatus of claim 30 wherein the at least one processor is configured to:
calculate a target sound level for the notification device based at least in part on the notification user; and
generate the notification message based at least in part on the target sound level.

34. The apparatus of claim 33 wherein the target sound level includes a beam steering element and a volume element.

35. The apparatus of claim 30 wherein the notification message includes one or more information elements configured to cause a display screen to display the notification message to the user.

36. An apparatus for providing a notification to a user in a home network, comprising:
means for receiving an alert from an electronic device;
means for determining a location for one or more users in the home network;
means for determining an activity for the one or more users in the home network;
means for determining an alert relevancy for the one or more users in the home network based on the electronic device;
means for determining a notification user and a notification device based at least in part on the location, the activity, and the alert relevancy for the one or more users in the home network;
means for generating a notification message for the notification user based at least in part on the notification user, the notification device, and the alert; and
means for sending the notification message to the notification device.

37. The apparatus of claim 36 wherein the means for determining the location of the one or more users further comprises means for determining the location of the one or more users based at least in part on one or more presence sensors in the home network.

38. The apparatus of claim 36 wherein the electronic device includes a means for determining an identity of a visitor, and wherein the means for determining the alert relevancy for the one or more users in the home network is based at least in part on the identity of the visitor.

39. The apparatus of claim 36 further comprising:
means for calculating a target sound level for the notification device based at least in part on the notification user; and
means for generating the notification message based at least in part on the target sound level.

40. The apparatus of claim 39 wherein the target sound level includes a beam steering element and a volume element.

41. The apparatus of claim 36 wherein the notification message includes means for causing a display screen to display the notification message to the user.

* * * * *